Jan. 21, 1964     C. H. ZIMMERMAN     3,118,392
AUTOMATIC VEHICULAR MONORAIL SYSTEM
Filed Sept. 21, 1959     20 Sheets-Sheet 2

INVENTOR
CHARLES H. ZIMMERMAN

BY

ATTORNEYS

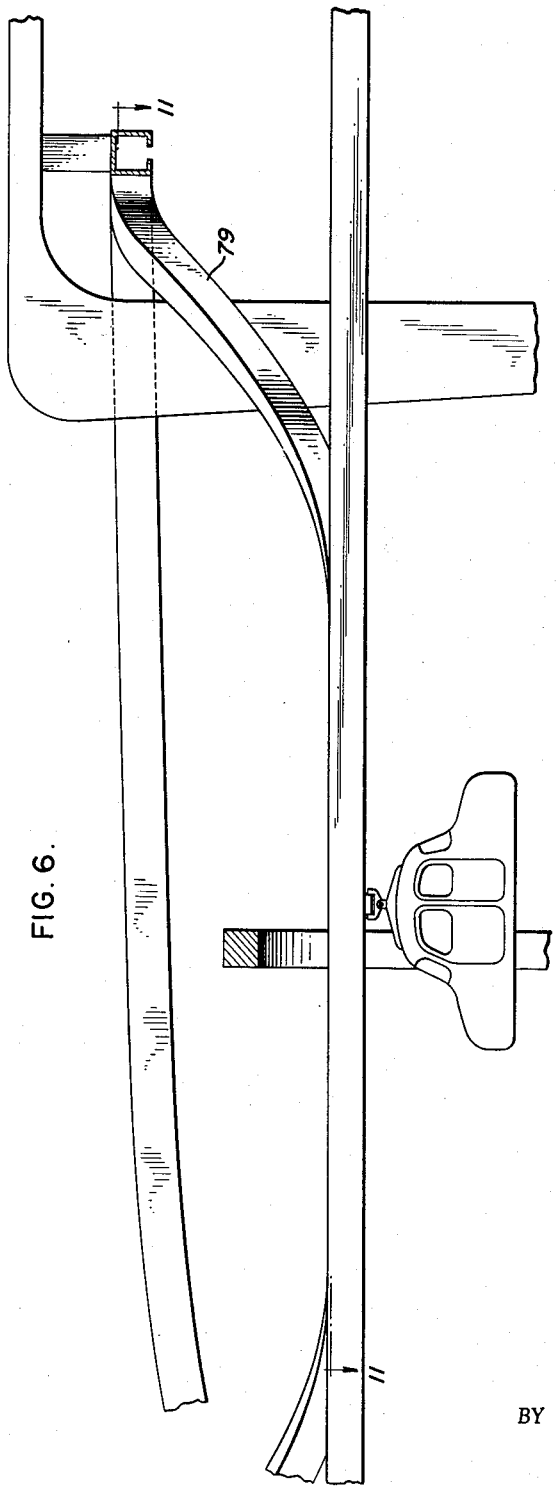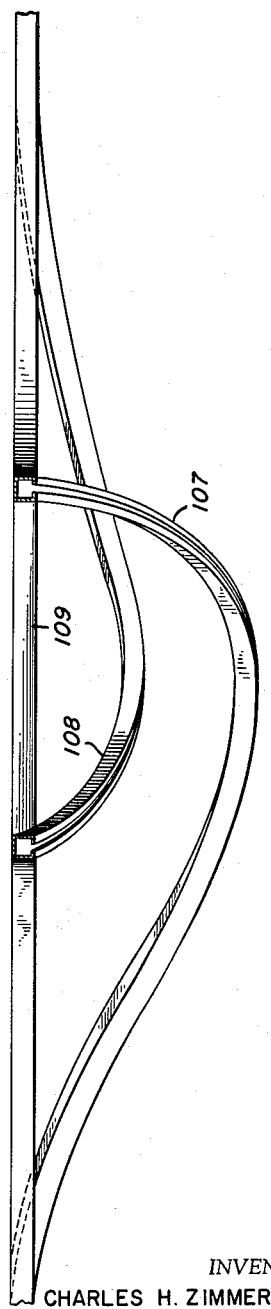

Jan. 21, 1964 C. H. ZIMMERMAN 3,118,392
AUTOMATIC VEHICULAR MONORAIL SYSTEM
Filed Sept. 21, 1959 20 Sheets-Sheet 7
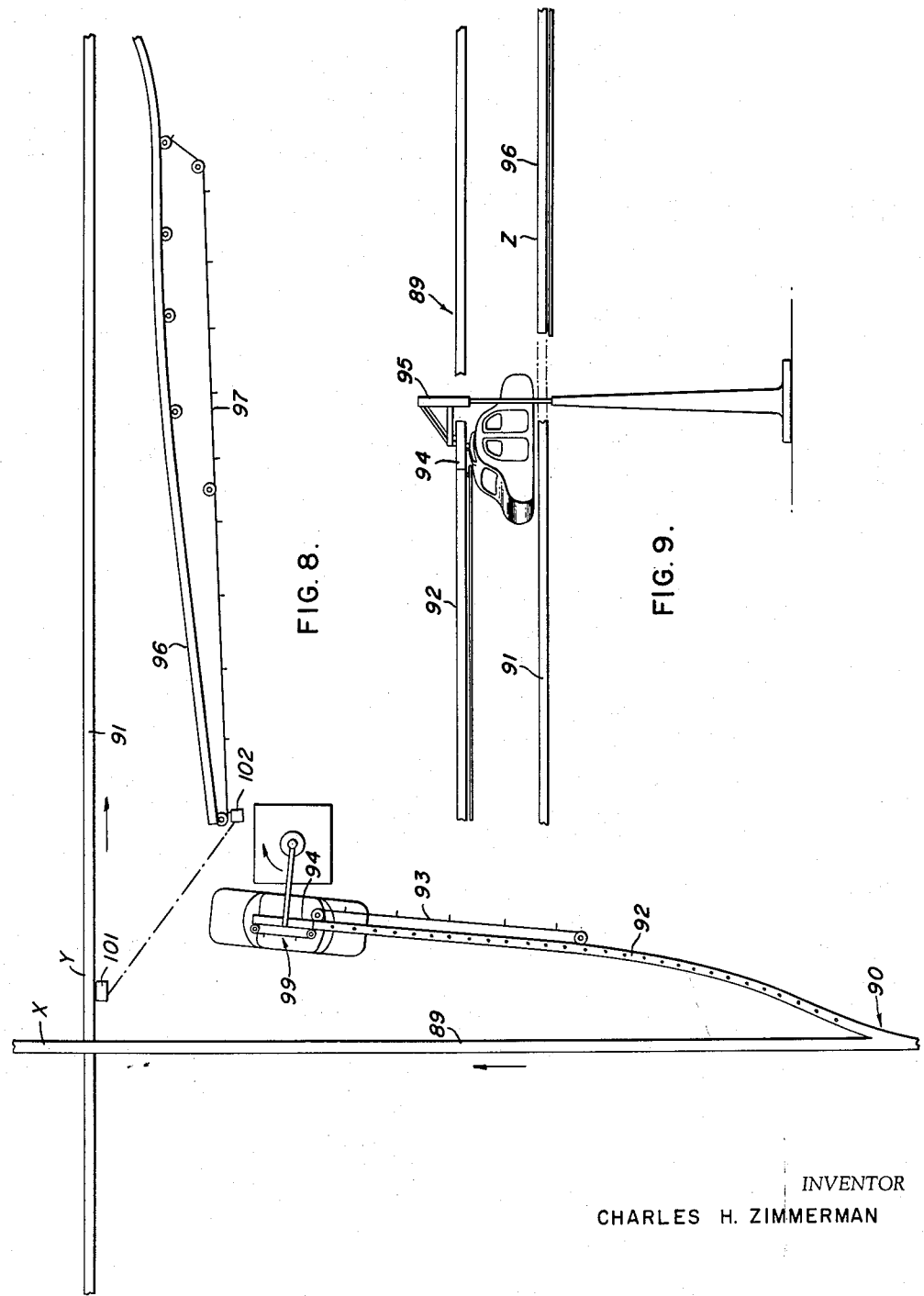
INVENTOR
CHARLES H. ZIMMERMAN
BY
ATTORNEYS Jan. 21, 1964

C. H. ZIMMERMAN 3,118,392

AUTOMATIC VEHICULAR MONORAIL SYSTEM

Filed Sept. 21, 1959

INVENTOR
CHARLES H. ZIMMERMAN

BY

ATTORNEYS

Jan. 21, 1964   C. H. ZIMMERMAN   3,118,392
AUTOMATIC VEHICULAR MONORAIL SYSTEM
Filed Sept. 21, 1959   20 Sheets-Sheet 9
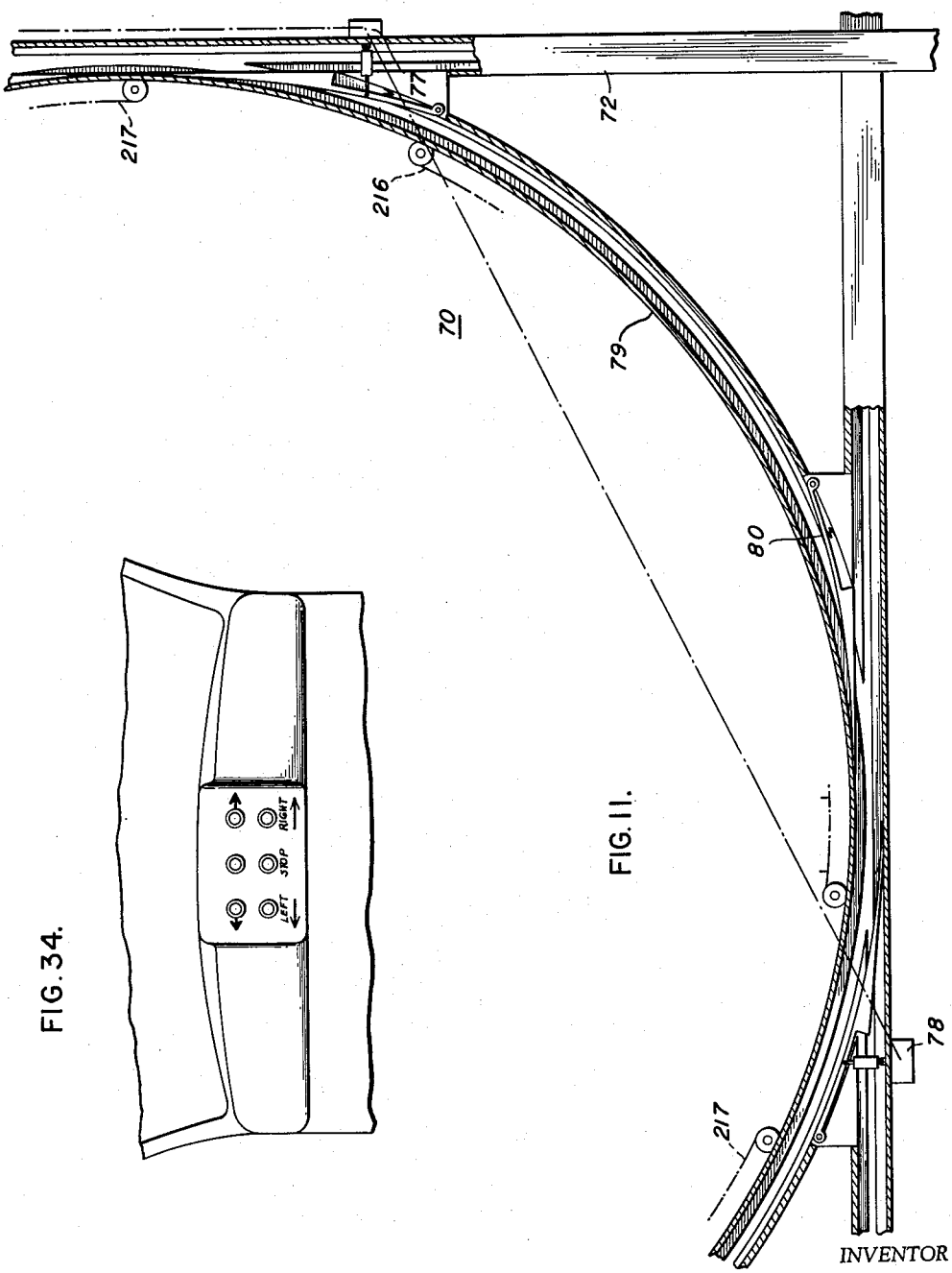
INVENTOR
CHARLES H. ZIMMERMAN
BY
ATTORNEYS Jan. 21, 1964    C. H. ZIMMERMAN    3,118,392
AUTOMATIC VEHICULAR MONORAIL SYSTEM
Filed Sept. 21, 1959    20 Sheets-Sheet 11
FIG. 14.
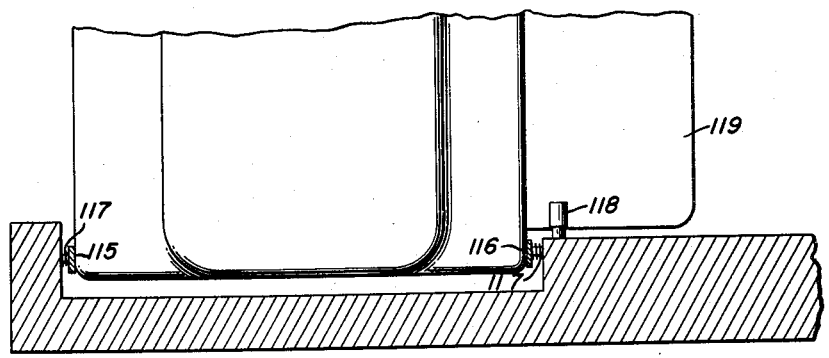
FIG. 15.
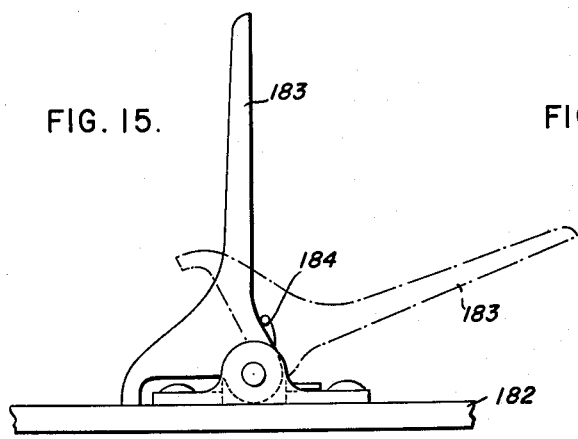
FIG. 16.
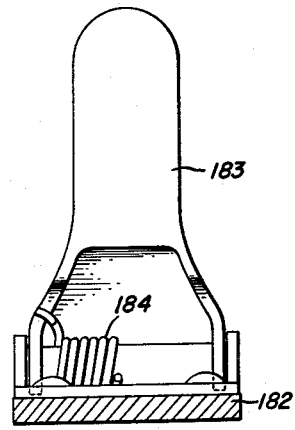
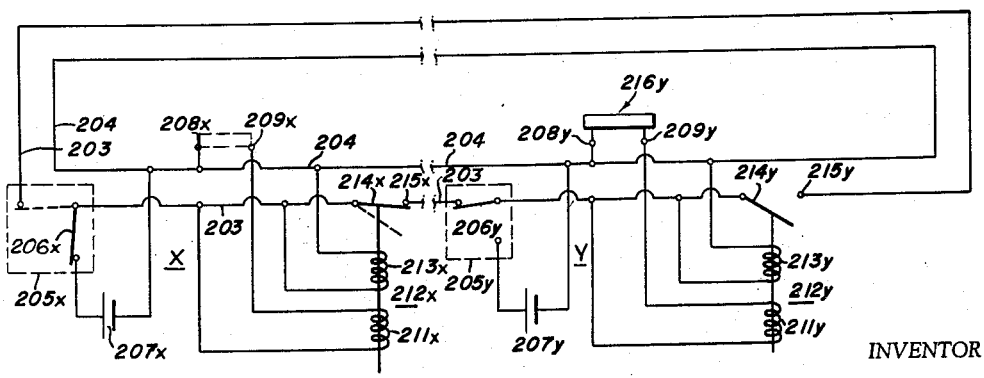
FIG. 35.
INVENTOR
CHARLES H. ZIMMERMAN
BY
ATTORNEYS Jan. 21, 1964     C. H. ZIMMERMAN     3,118,392
AUTOMATIC VEHICULAR MONORAIL SYSTEM
Filed Sept. 21, 1959     20 Sheets-Sheet 12

INVENTOR
CHARLES H. ZIMMERMAN

BY

ATTORNEYS

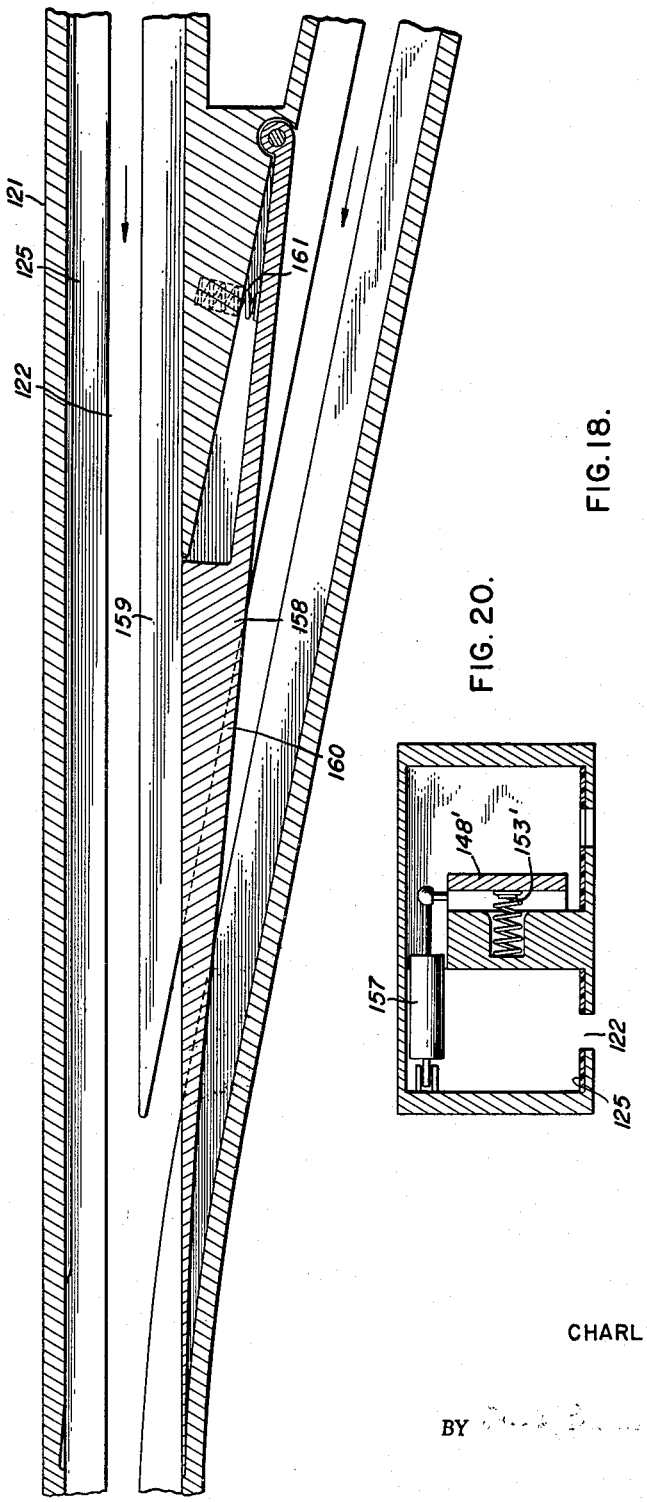
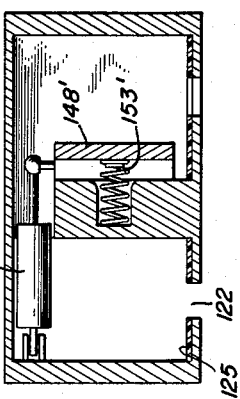
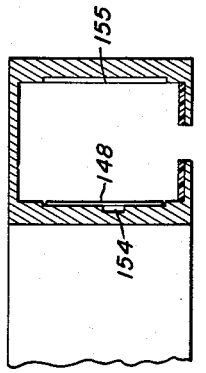
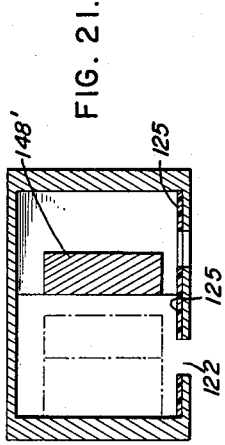

Jan. 21, 1964     C. H. ZIMMERMAN     3,118,392
AUTOMATIC VEHICULAR MONORAIL SYSTEM
Filed Sept. 21, 1959     20 Sheets-Sheet 14

INVENTOR
CHARLES H. ZIMMERMAN

BY

ATTORNEYS

Jan. 21, 1964  C. H. ZIMMERMAN  3,118,392
AUTOMATIC VEHICULAR MONORAIL SYSTEM
Filed Sept. 21, 1959  20 Sheets-Sheet 15

INVENTOR
CHARLES H. ZIMMERMAN
BY
ATTORNEYS

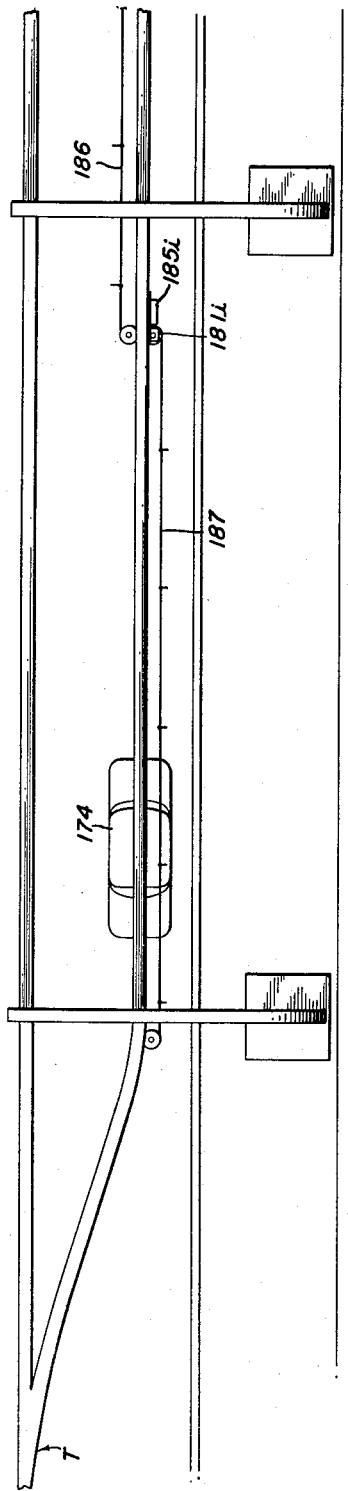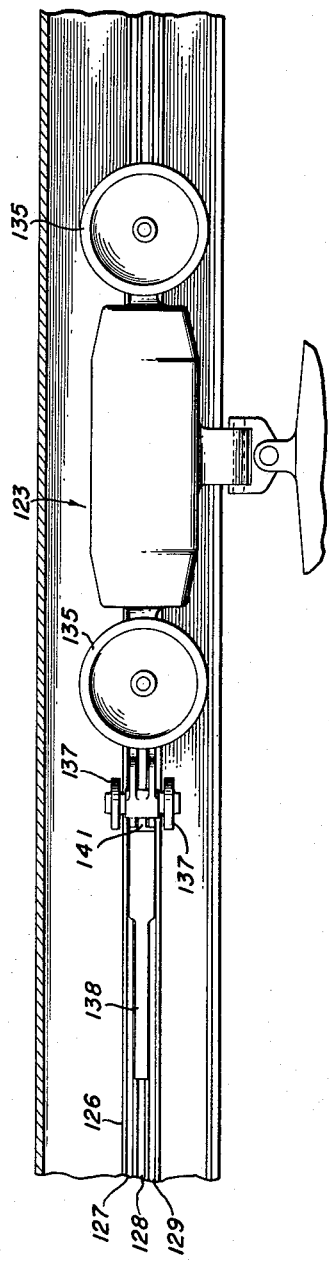

Jan. 21, 1964 C. H. ZIMMERMAN 3,118,392
AUTOMATIC VEHICULAR MONORAIL SYSTEM
Filed Sept. 21, 1959 20 Sheets-Sheet 17

INVENTOR
CHARLES H. ZIMMERMAN

BY

ATTORNEYS

INVENTOR
CHARLES H. ZIMMERMAN

BY

ATTORNEYS

Jan. 21, 1964     C. H. ZIMMERMAN     3,118,392
AUTOMATIC VEHICULAR MONORAIL SYSTEM
Filed Sept. 21, 1959     20 Sheets-Sheet 19

INVENTOR
CHARLES H. ZIMMERMAN
BY

ATTORNEYS

INVENTOR
CHARLES H. ZIMMERMAN

BY

ATTORNEYS

United States Patent Office 3,118,392
Patented Jan. 21, 1964

3,118,392
AUTOMATIC VEHICULAR MONORAIL SYSTEM
Charles H. Zimmerman, 213 Green St.,
Alexandria, Va.
Filed Sept. 21, 1959, Ser. No. 841,344
22 Claims. (Cl. 104—88)

This invention relates to an automatic vehicular monorail system, and particularly to an overhead monorail system in which self-propelled vehicles automatically move from station to station with little or no manual control required.

An object of the invntion is to provide a vehicular monorail system which includes a plurality of individual self-propelled vehicles adapted to travel at a common, uniform speed on a main monorail track to selected station stops along the line, and once diverted to a station each vehicle is moved on a second monorail track under the control of instrumentalities located at the selected station.

Another object of the invention is to provide a vehicular monorail system in which the stations along the main monorail track are provided with automatic interrogation facilities such that the absence of a car at a desired station institutes automatic interrogation of stations up the line from the desired station until an up line station is reached where a vehicle is available, and automatically effects the movement of said available vehicle from the up line station onto the main monorail track, to the desired station and automatically brings the vehicle to a stop at the desired station.

Another object of the invention is to provide a vehicular monorail system which is not subject to obstruction by the elements such as rain, ice or snow.

Another object of the invention is to provide a reliable drive system which will maintain the speed of the vehicle uniform on the main monorail line at some predetermined speed.

Another object of the invention is to provide devices for switching the vehicles off of the main monorail track onto secondary monorails at station stops and on interchanges between main monorail lines as desired.

Still another object of the invention is to provide a vehicular monorail system with means to stop a vehicle at a predetermined deceleration rate after being switched off of the main monorail track to a station monorail track or at an interchange between a main monorail track and a second main monorail track so that the vehicle may properly negotiate turns involved in the interchange or be moved through a station stop.

A further object of the invention is to provide apparatus for moving the vehicles through a station to an unloading point, a loading point and an acceleration section, automatically as desired.

Another object of the invention is to provide apparatus for automatically controlling the movement of vehicles in interchanges between the main monorail lines.

Yet another object of the invention is to provide means at each of the station stops and interchanges for accelerating a vehicle from a stopped position on the station monorail or interchange track to a uniform speed which is maintained on the main monorail track.

Still another object of the invention is to provide a vehicular monorail system incorporating interlocks between main monorail tracks and the station stops and interchanges which will positively prevent the acceleration of a vehicle from a stop position at the station or interchange to the uniform speed of the system unless entrance onto the main monorail track can be safely made without affecting the spacing between cars already on the main monorail track.

Another object of the invention is to provide means for by-passing stopped vehicles at a station stop whenever it is required for another vehicle to pass said stopped vehicle in the station.

The invention features a main monorail track along which self-propelled vehicles are adapted to travel. Preferably, the monorail is rectangularly shaped in cross-section and is slotted on its underside for its entire length. A motorized carriage travels in the monorail at a uniform speed. A projection depending from the carriage through the monorail slot supports a car which, in the embodiment described hereinafter, may carry several passengers. Conductors carried in the main monorail supplies power to a synchronous motor carried by each carriage.

There may be a plurality of stations along the main track, each having a second monorail track running substantially parallel to the main monorail track and constructed similarly to the main monorail track. In a preferred embodiment the station monorail tracks are not provided with electrical power conductors. Switch means selectively divert the vehicles into a station, while a series of automatically energized conveyers move the individual vehicles through the station with several stops therealong. Interlocking devices prevent operation of the conveyers if a preceding vehicle obstructs the passage of the following vehicle until the preceding vehicle has moved from that position.

As noted earlier, the vehicles are self-propelled and move at uniform speed maintained on the main monorail track and are spaced, for safety reasons, so that a certain distance exists between the vehicles. When a vehicle is prepared to enter the main monorail track from a station or interchange monorail track, it is desirable that this spacing be maintained. Therefore, an accelerating conveyer system running along the station or interchange monorail track accelerates the vehicle to the system speed. However, interlocks positioned along the main monorail prevents energization of the accelerating conveyer system, if a vehicle or vehicles along the main monorail track with which the vehicle located at a station or interchange would interfere. After the vehicles on the main monorail track have passed, then the accelerating conveyer is energized to accelerate the vehicle to the common system speed.

For transferring a vehicle from one main monorail system to another main monorail system the invention features interchanges which are adapted to automatically control the movement of a vehicle, once it is in the interchange, through the interchange. For this purpose, the interchanges includes vehicle decelerating devics, conveyer systems for moving the vehicle through the interchange and a vehicle accelerating conveyer system for accelerating the vehicle to the speed of the system which it is to enter. Interlocking control devices prevent operation of the conveyer systems until it is permissible to do so.

A series of conveyors positioned along the station monorail track are adapted to move the vehicles to various points in each station. Also, a braking system extending along the non-accelerating portion of the station monorail, cooperates with the conveyers, to prevent movement of the vehicles until a positive moving force is applied thereto. Thus, if a vehicle is diverted from the main monorail track by a switch, these brake devices along the station monorail track decelerates the vehicle to zero speed. However, the first conveyer along the station monorail track energized on operation of the monorail switch, and having a linear speed substantially less than the uniform speed maintained on the main monorail track, is effective when the vehicle has been decelerated by the braking means to a speed slightly below the speed of the conveyer to move the vehicle to a discharge or unloading point. Interlocks between this conveyer and a conveyer for moving the car through another portion of the station stop prevents the operation of this conveyer until there is an open position in the station to receive this vehicle.

Another feature of the invention is a control device for controlling the operation of the switch devices at the stations or interchanges. Normally, only three controls are necessary: "Stop," "Left," and "Right." The "Stop" control automatically controls the first switching device along the main monorail track to automatically divert the car from the main monorail line to a station and stop, while the "Left" and "Right" controls control the left and right direction in shifting the vehicle from, say, the main line to a station stop or to an interchange for changing the car from one main monorail system to another main monorail system which systems carry vehicles in different directions.

Each station stop is provided with a vehicle sensing device. The vehicle sensing devices at up line stations are interconnected with down line sensing devices and are capable of effecting movement of an available vehicle at one up line station to a down line station initiating an interrogation signal. The interconnection of the sensing devices is such that one interrogation signal from a down line station sequentially effects interrogation of the up line stations until the nearest up line station is found which has an available vehicle. The nearest available vehicle is then automatically moved to the station initiating the interrogating signals.

The novel features that are considered characteristic of this invention are set forth with particularity in the appended claims. The invention itself, however, both as to its organization and operation, as well as additional objects, advantages and features thereof, will best be understood from the following description when read in connection with the accompanying drawings, in which:

FIG. 6 is a sectional view taken on lines 6—6 of FIG. 5;

FIG. 8 is a partial plan view of another embodiment of the interchange arrangement;

FIG. 9 is an elevational view of the interchange shown in FIG. 8;

Figure 10:
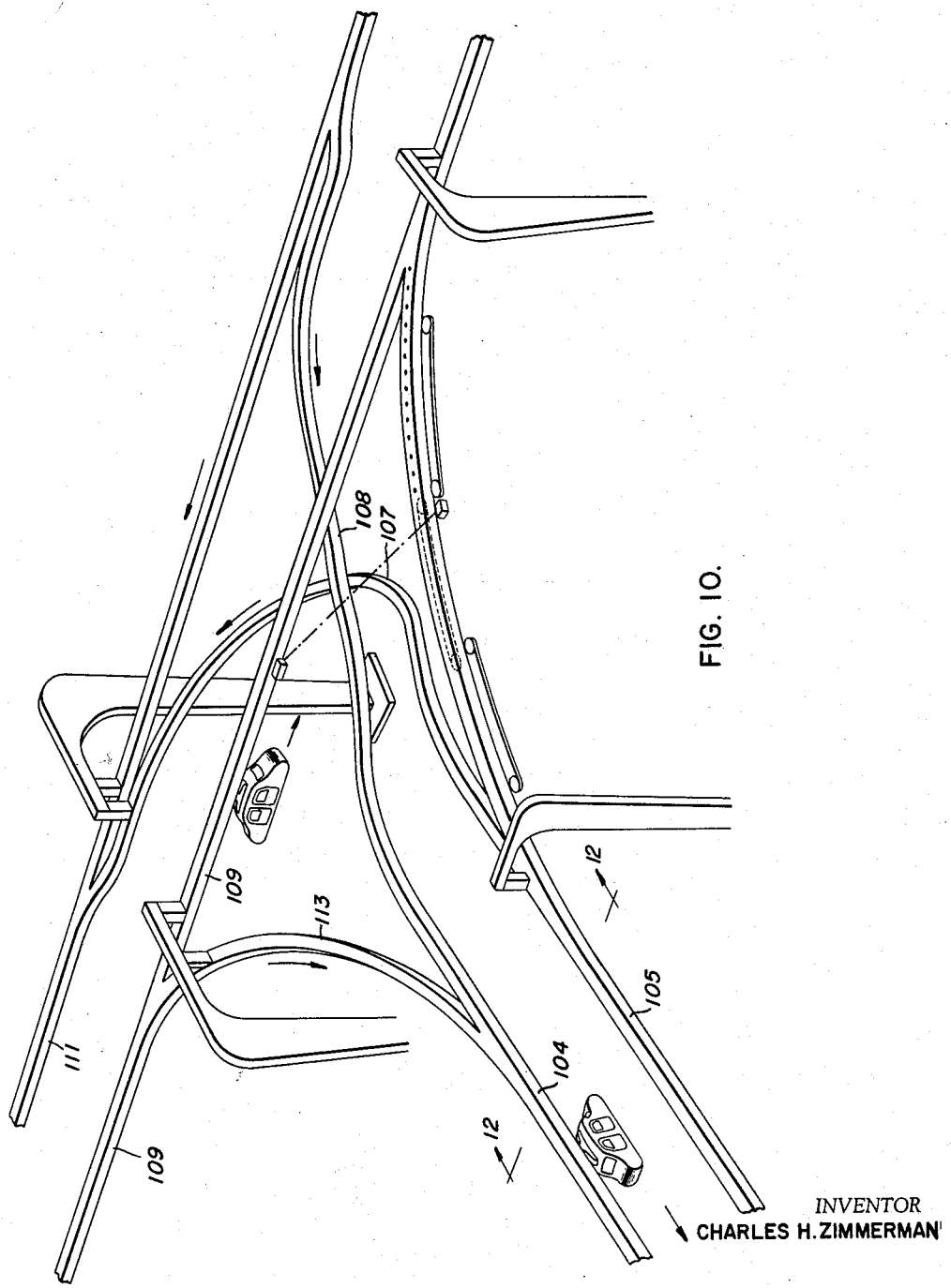
Figure 13:
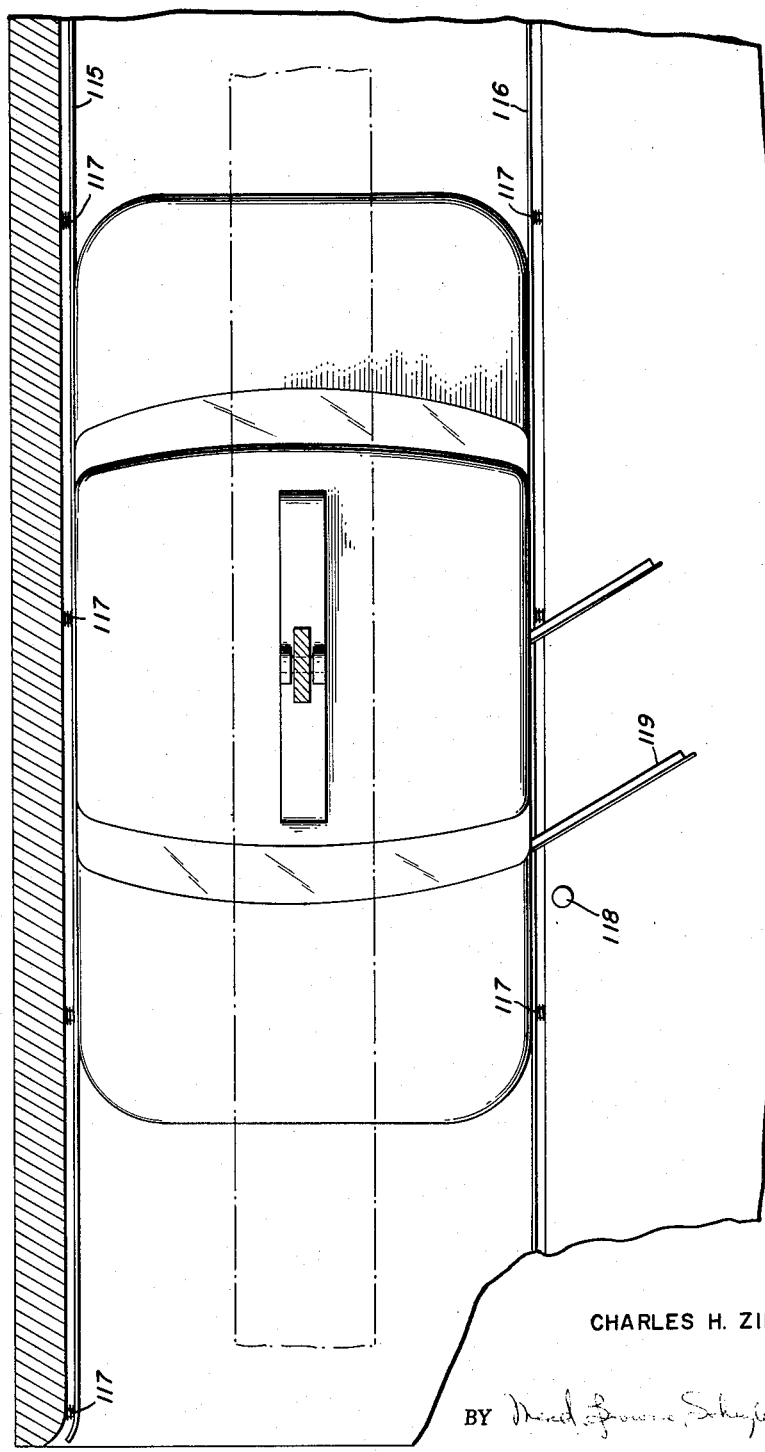
Figure 17:
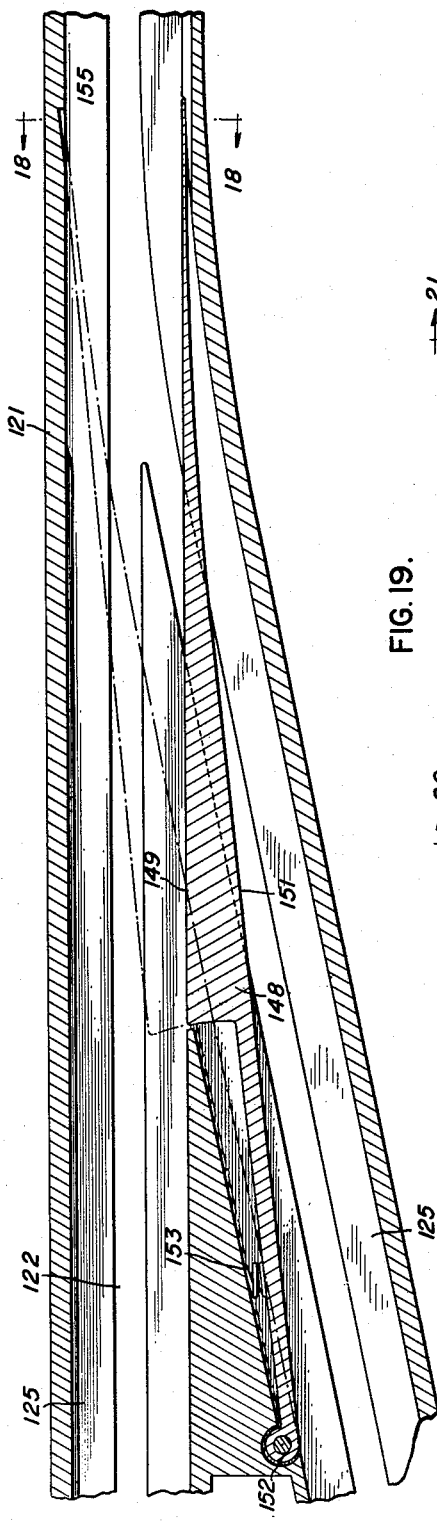
Figure 19:
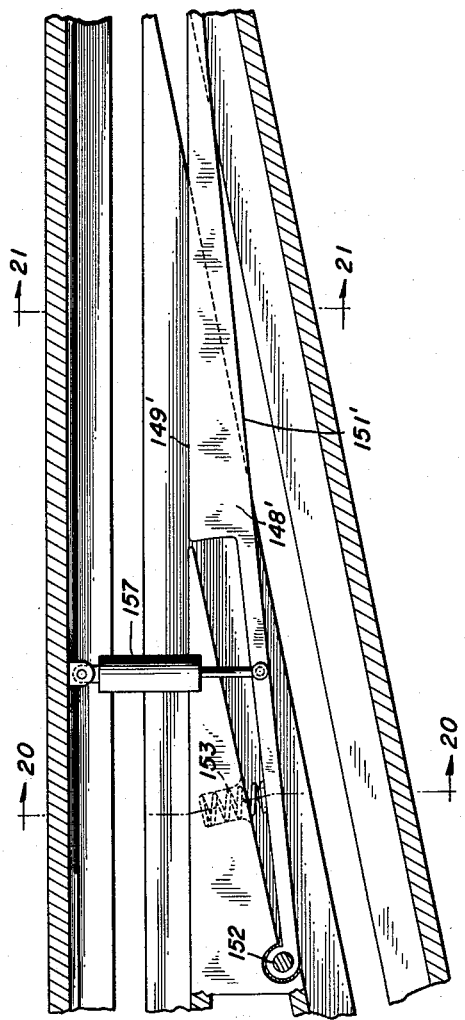
Figure 23:
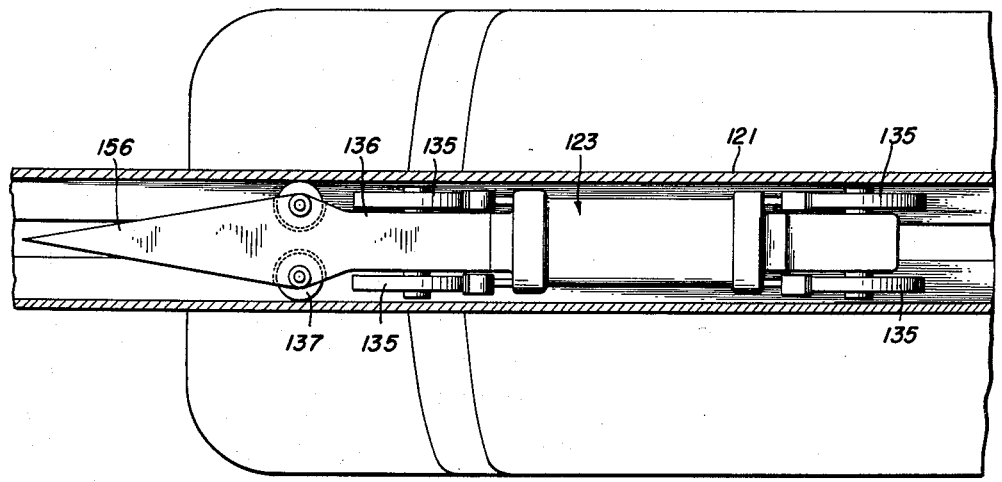
Figure 23A:
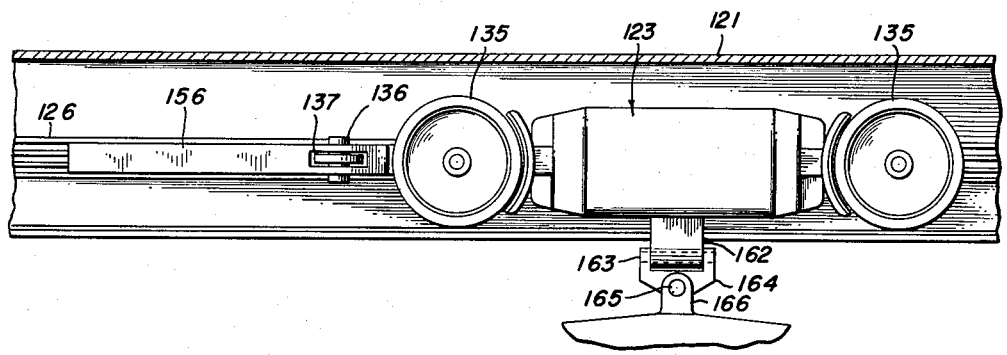
Figure 24:
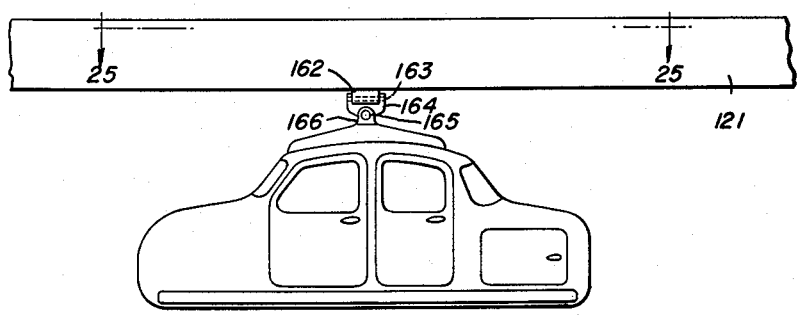
Figure 25:
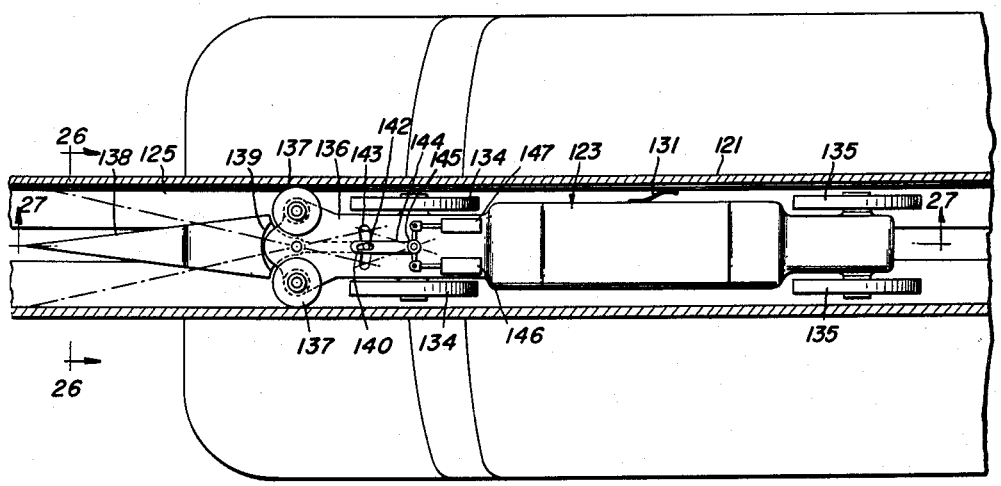
Figure 26:
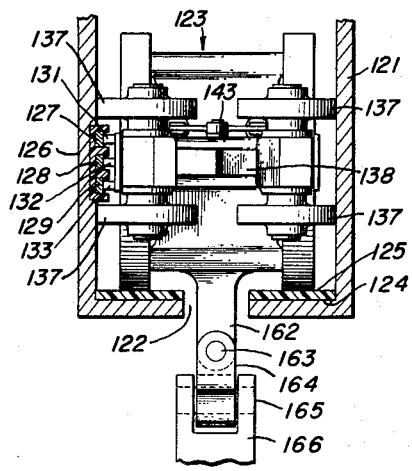
Figure 28A:
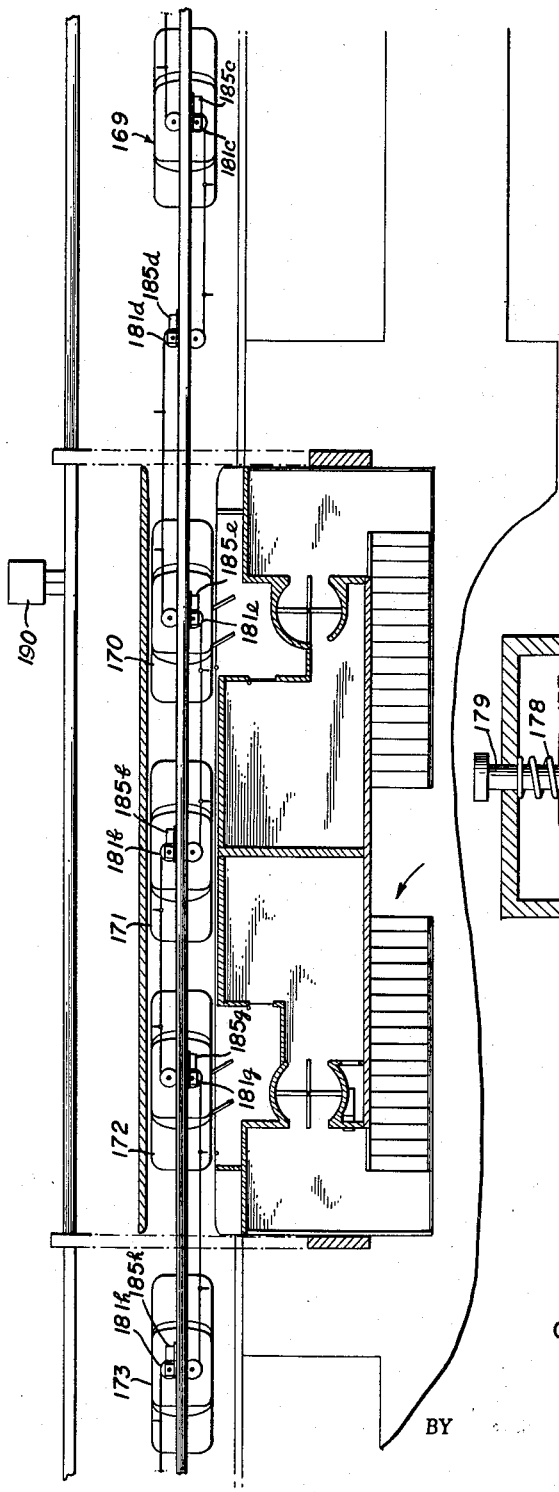
Figure 30:
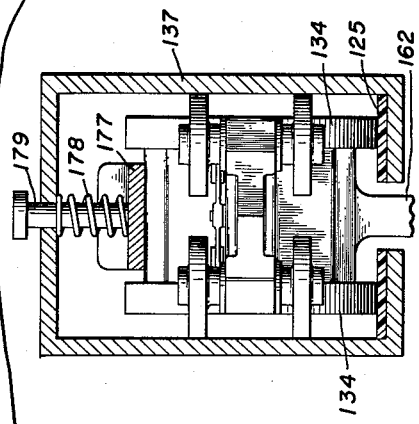
Figure 28B:
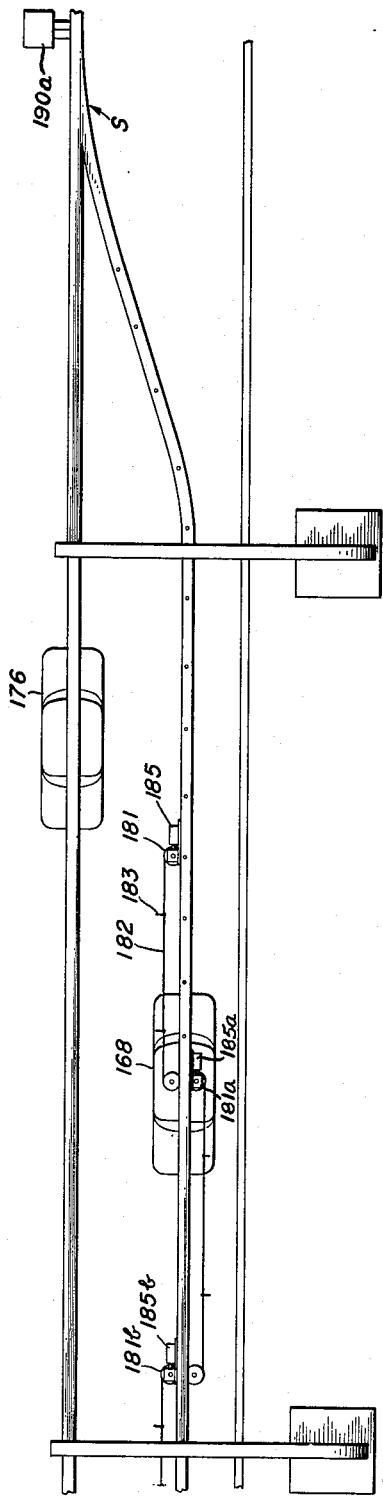
Figure 29:
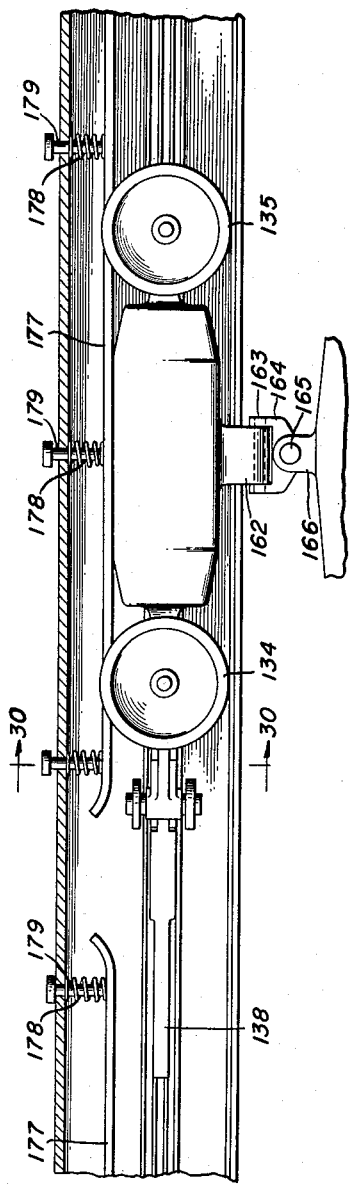
Figure 31:
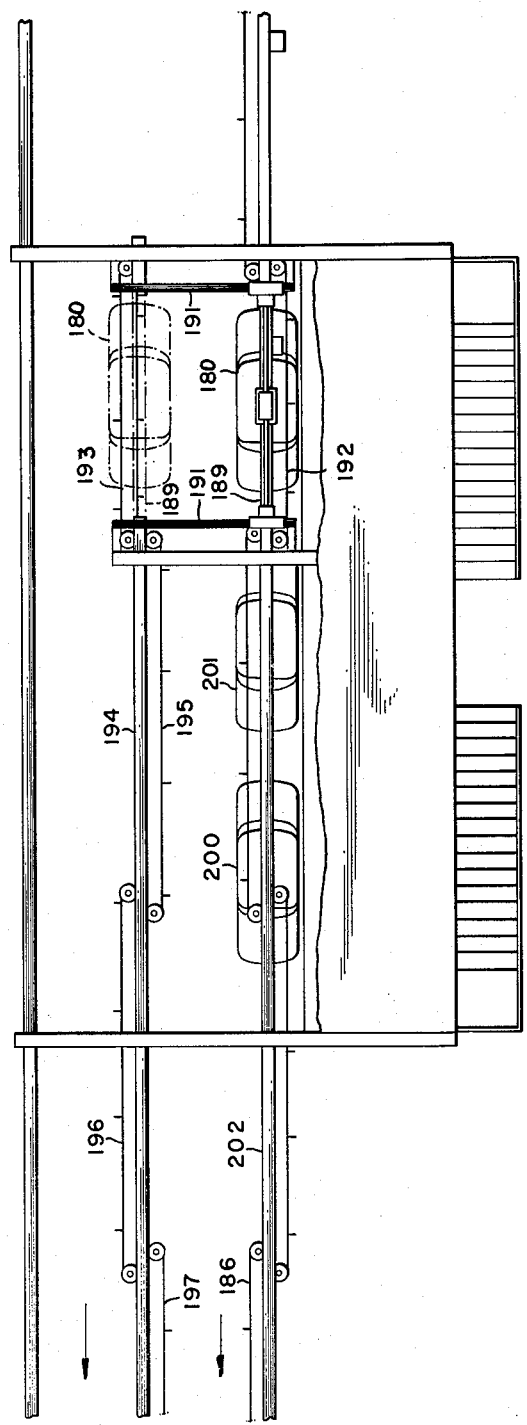
Figure 31A:
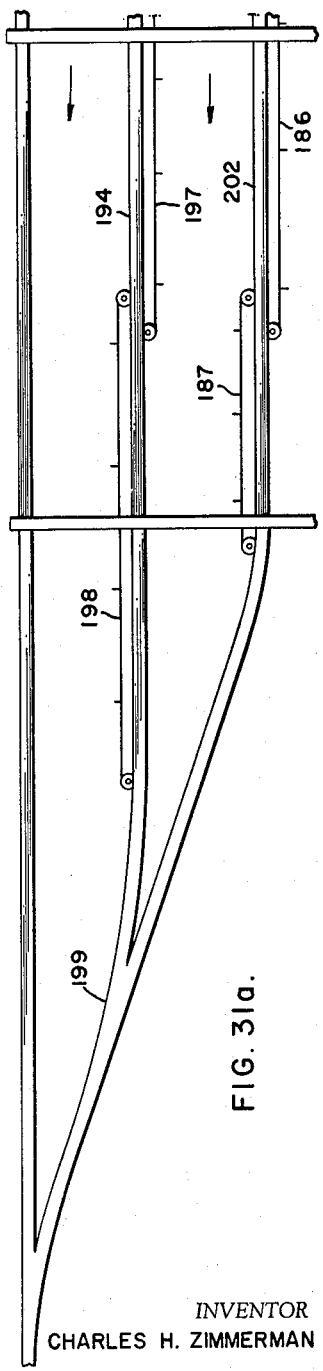
Figure 32:
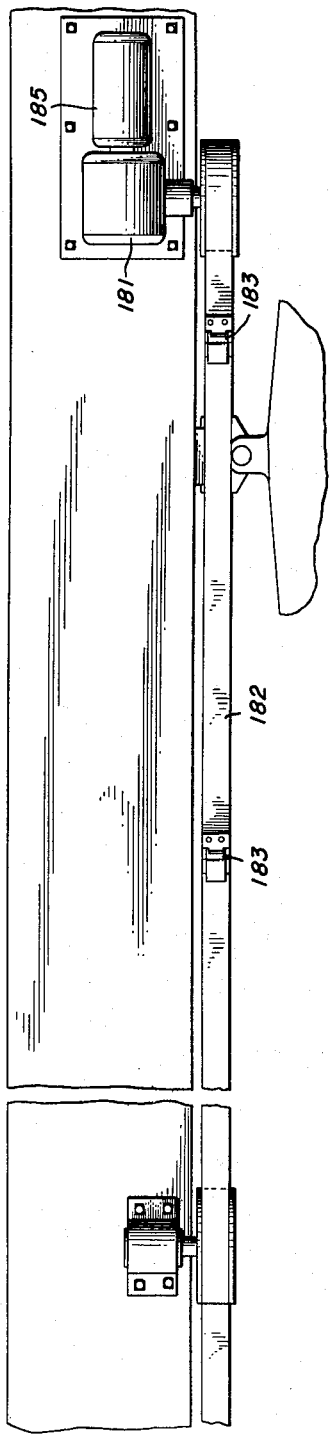
Figure 33:
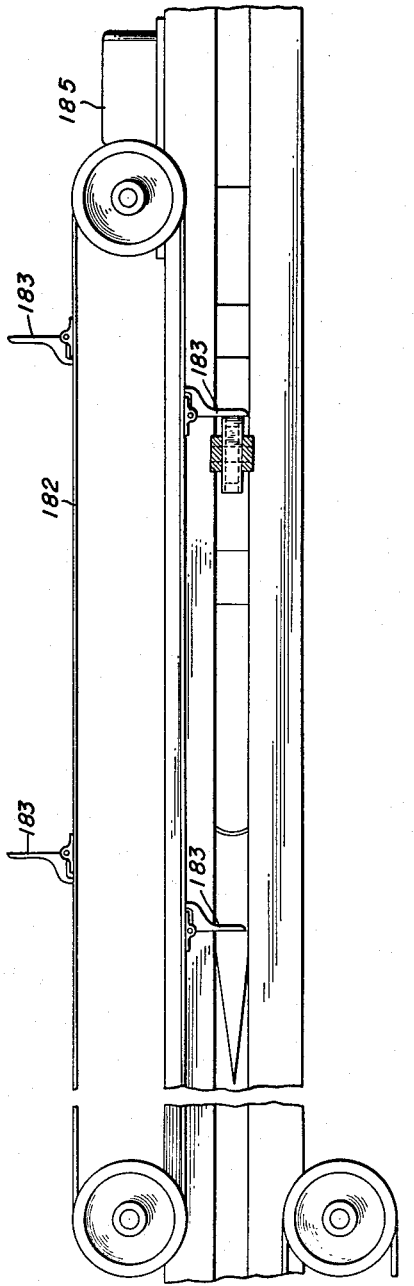

FIG. 10 discloses a T type intersection;

FIG. 11 is a sectional view of a curved section of monorail track taken on lines 11—11 of FIG. 6;

FIG. 12 is a sectional view taken on lines 12—12 of FIG. 10;

FIG. 13 is a plan view of a vehicle at a station stop;

FIG. 14 is a partial elevational view of a vehicle at a station stop;

FIGS. 15 and 16 show two views of a spring biased projecting arm for a conveyer system at the station stops and some of the interchanges;

FIGS. 17 and 19 illustrate typical monorail track switches, the switch shown in FIG. 17 being operated by mechanical interaction between a vehicle and the switch guidance element while the switch shown in FIG. 19 is hydraulically or electrically controlled from signals transmitted from the vehicle;

FIG. 18 is a cross-sectional view on lines 18—18 of FIG. 17;

FIGS. 20 and 21 are cross-sectional views taken on lines 20—20 and 21—21, respectively, of FIG. 19;

FIG. 22 illustrates a typical entrance switch to a main monorail track;

FIGS. 23 and 23a are plan and elevational views, respectively, of a motorized carriage with a fixed lance projecting from the front thereof;

FIG. 24 is a view of a car which may be suspended from the carriage shown in FIGS. 23 and 23a;

FIG. 25 is a plan view on line 25—25 of FIG. 24 showing a motorized carriage with a modified lance structure;

FIGS. 26 and 27 are cross-sectional views taken on lines 26—26 and 27—27, respectively, of FIG. 25;

FIGS. 28, 28a and 28b are to be taken collectively, end-to-end, and show in detail a typical station stop with station conveyers for moving the vehicles through various points at the station;

FIG. 29 shows a braking arrangement suitable for use with the monorail track system;

FIG. 30 is a cross-sectional view taken on lines 30—30 of FIG. 29;

FIGS. 31 and 31a are to be viewed collectively, end-to-end, and show a typical station by-pass arrangement for vehicles, at a station, which may stop at an unloading or discharge point and then proceed to pass idle vehicles at the station for re-entrance to the main monorail system;

FIG. 32 is an elevational view of a typical conveyer section used in stations and interchanges;

FIG. 33 is a plan view of a typical conveyer section used in stations and interchanges;

FIG. 34 is a view in a car interior showing a typical car control panel; and

FIG. 35 is a schematic diagram of electrical signalling system for automatically calling a vehicle from an up line station to a down line station.

While the invention is described in detail hereinafter in connection with a passenger transportation system, it is not intended to necessarily be so restricted since the invention and features thereof apply to all forms of vehicular monorail systems.

Figure 1:
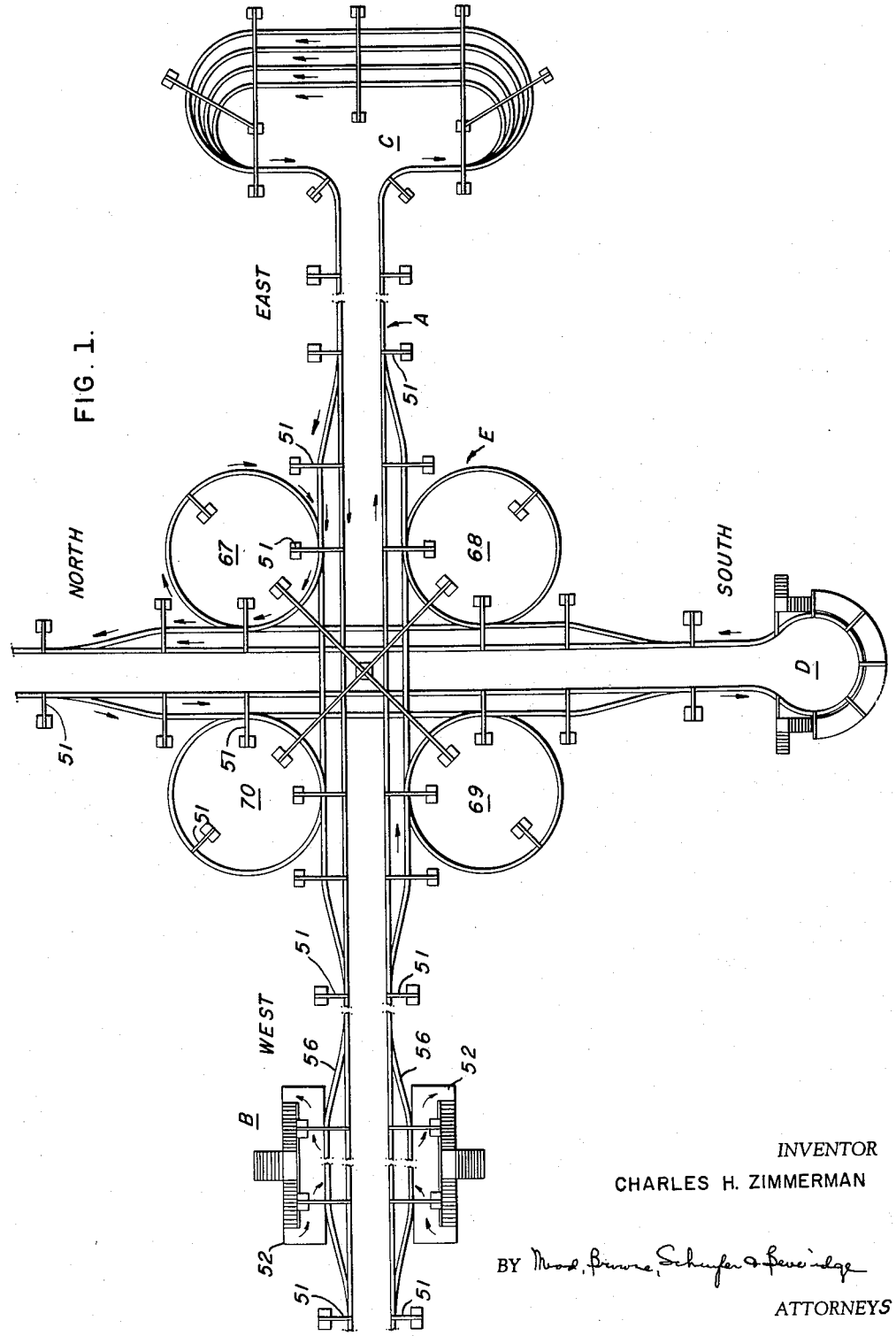
FIG. 1 illustrates a plan view of an overhead monorail system showing main monorails A, a station stop B, end line vehicle storage C, an end of line turn around D and a typical cloverleaf interchange E.

Referring to FIGS. 1 through 4, there is illustrated a monorail system which comprises an overhead monorail track A supported from posts 51. There may be a pluraility of stations along the main monorail track, one of which is designated generally at B in FIG. 1 and shown in FIG. 4. The end stations of each line comprises a circular station as shown at D in FIG. 1, or the end of each line may comprise a plurality of monorail tracks as shown generally at C of FIG. 1, where the system vehicles may be stored. Where two main monorail lines cross, for example, an east-west monorail system and a north-south monorail system, it is desirable to provide means for transferring a vehicle from one system to another system, and this, in the embodiment shown in FIG. 1, is by a clover-leaf structure designated generally by the letter E. The clover-leaf system is shown in detail in FIG. 5, and described more fully hereinafter.

Figure 2:
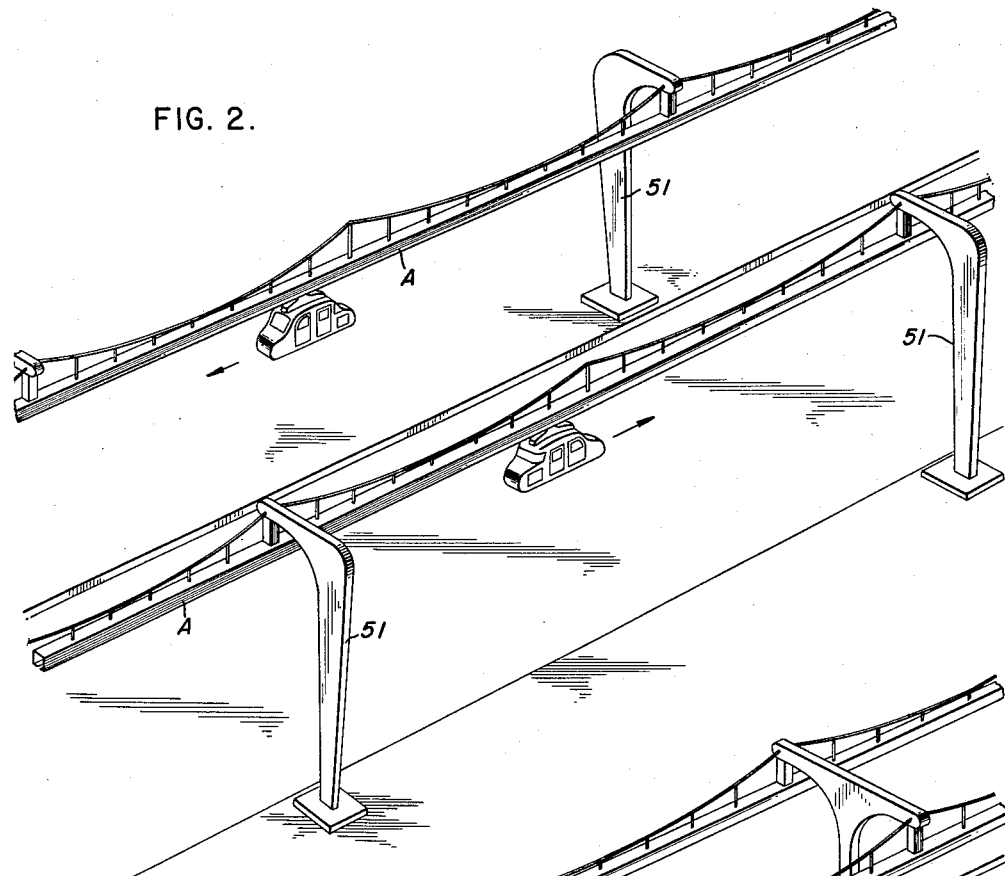
FIG. 2 illustrates an overhead monorail track portion utilizing existing street or railway systems without interference with ground traffic.
Figure 3:
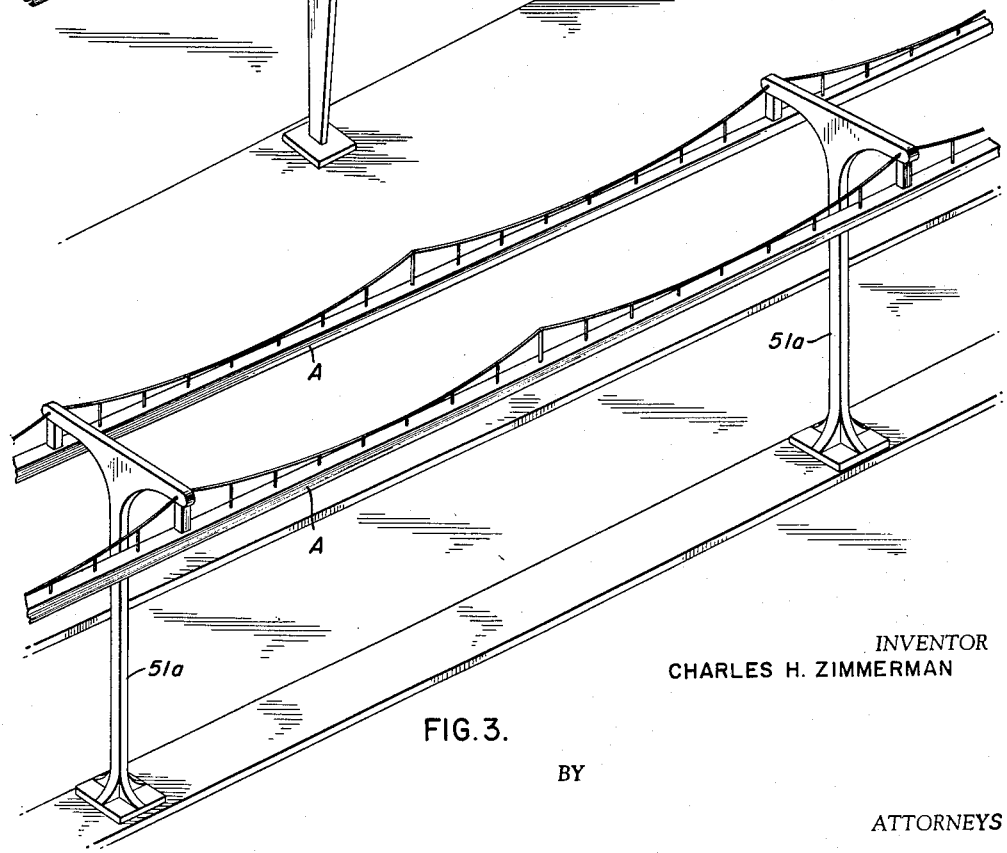
FIG. 3 shows an overhead monorail track utilizing the divider strip between divided highways, or abandoned railway lines.

Two typical monorail installations are shown in FIGS. 2 and 3, the one shown in FIG. 2 is designed to utilize an existing street or railway without interference with ground traffic, while the installation shown in FIG. 3 is for use where there are sufficiently wide separation strips between the lanes of divided highways, or for installation where railways have been abandoned or where there are no roadways. In the installation shown in FIG. 2, the posts are L-shaped while the installation shown in FIG. 3, the posts are T-shaped and designated generally as 51a. These posts may be made from precast concrete or structural steel, the exact shape and construction being of no importance to this invention.

Figure 4:
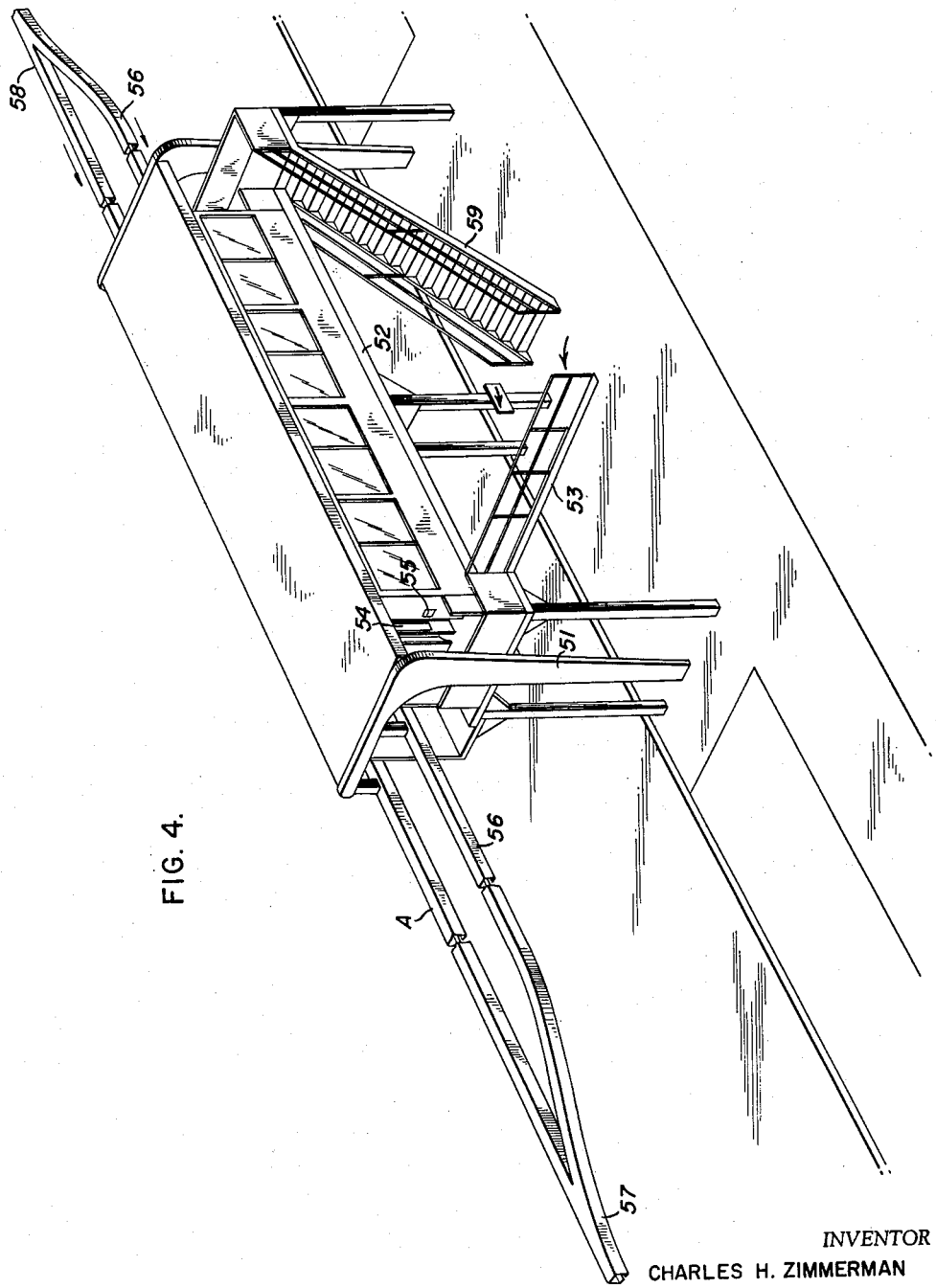
FIG. 4 illustrates a typical station stop.

A typical station stop is indicated in FIG. 4 and includes an elevated platform 52 supported above ground level at a height substantially equal to the height of a floor of a vehicle above the ground. Platform 52 is provided with steps 53 leading to a turnstile 54 entrance and fare slot 55. The station platform is suitably enclosed to protect passengers from the weather. A station monorail 56 runs substantially parallel to the main monorail track A through the station stop parallel to the station platform 52. The ends of the station monorail 56 intersect the main monorail A at 57 and 58 providing entrance to the main monorail system and exit from the main monorail system to the station stop respectively, all of which will be described more fully hereinafter in connection with the movement of a vehicle through the station stop. Steps 59 lead from the discharge section of the station stop.

Figure 5:
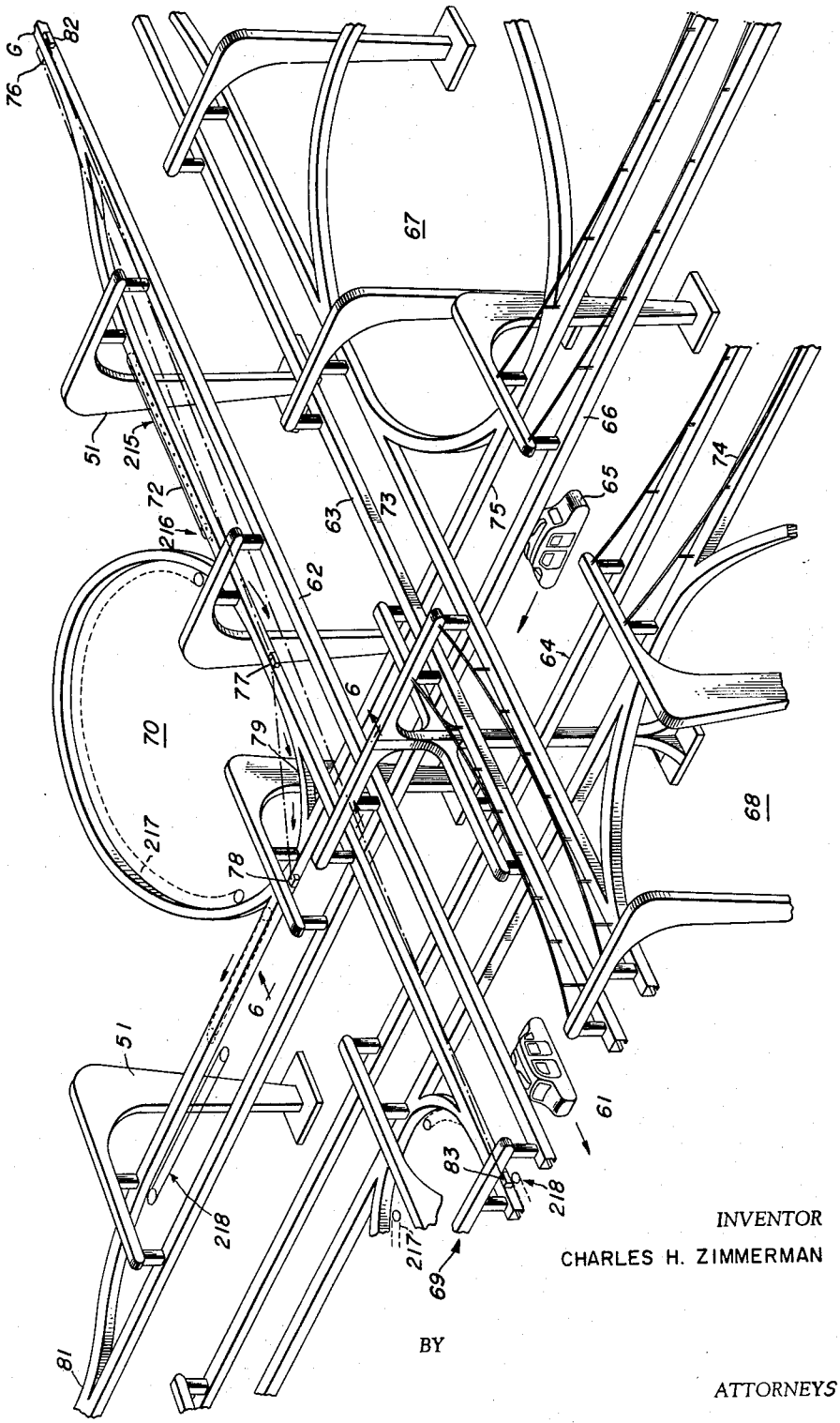
FIG. 5 is a detailed view of cloverleaf interchange E shown in FIG. 1.

Referring to FIGS. 5 and 6, the north and south main monorail tracks are shown elevated above the east and west tracks as are the auxiliary parallel tracks, which differences in elevation are to allow proper clearance for the cars passing through the intersection. The leafs of the clover-leaf, however, have different elevations around the arcs so that, in proper cases, a car may be elevated or lowered to the level of the track in the direction desired.

Suppose, for instance, south bound car 61 had been approaching point G traveling from right to left in FIG. 5, and it is desired to transfer to west bound monorail track 66. The "Right" button, shown on the control panel of FIG. 34, is depressed by a passenger. Automatically, the transfer is made on an auxiliary track system through switching devices located at the interchange. When desired, each auxiliary monorail track section is provided with a vehicle deceleration or braking section 215, conveyers 216, 217 for moving vehicles along the auxiliary monorail system, an accelerating section 218 and interlock devices 82 and 83 to prevent movement of vehicles when such movement might interfere with operations on the main monorail system. In FIG. 5, for example, interlock device 82 would have been actuated by the passage of car 61 on south bound track 62 to prevent the operation of acceleration section 218 through the agency of interlock device 83. The complete construction and operation of substantially similar switching devices as well as the deceleration and conveyer arrangements are described more fully hereinafter in connection with a station stop. A switching device control 76 is energized to cause the vehicle to shift to parallel side track 72 where the vehicle is decelerated by a braking device, similar to the one shown in FIG. 30. In addition, switching devices 77 and 78 are conditioned for operation through a mechanical or electrical linkage with switching device 76 and conveyer 216 begins to operate. Referring to FIGS. 6 and 11, it will be seen that the vehicle 61 will be moved by conveyer system 216 and switched from parallel track 72, through switch 77 to a short descending track section 79. Switch 78, diverts the vehicle from the short descending track section 79 to a side track 75 parallel to westbound monorail 66 for forward movement therealong, right to left as shown in FIG. 6. The vehicle will be accelerated by an acceleration conveyer 218 for entry on the westbound monorail tracks at switch point 81. However, interlocking devices, which will be described more fully hereinafter, controlling accelerating conveyer 218 delays entrance of the vehicle onto the westbound monorail track if there would be any interference with the spacing of the vehicles near the intersection on the westbound monorail 66 until the entrance can be effected safely.

Now, assume vehicle 61 is again approaching point G and it is desired to transfer to an eastbound monorail line. The passenger depresses the "Left" button shown in FIG. 34. This will also operate device 76. However, device 76 is now linked to switching devices on clover-leaf 69 (shown partially in FIG. 5) which switching devices are constructed similarly to the ones shown in FIG. 6. These switching devices in cooperation with a conveyer system 217, somewhat similar to conveyer system 216, move the vehicle completely around clover-leaf 69 so that the vehicle will enter parallel side monorail track 74 and proceed on side monorail 74 to an intersection (not shown in FIG. 5) with the east monorail track 64. As noted in connection with the south to west transfer, the acceleration of the vehicle may be delayed if entrance on the east monorail would interfere with any vehicle in or approaching the interchange on the eastbound monorail track system.

Interlock device 82, shown only on main monorail track 62, but actually included on all of the tracks, cooperates with a second interlocking device 83 on a parallel track 72 to delay the acceleration and entrance of the vehicle from the side track onto the main track until the vehicle on the main tracks has safely passed the intersection. These interlock devices control the accelerating conveyer systems, such as conveyer 218, to prevent their operation until it is safe to do so.

Figure 7:
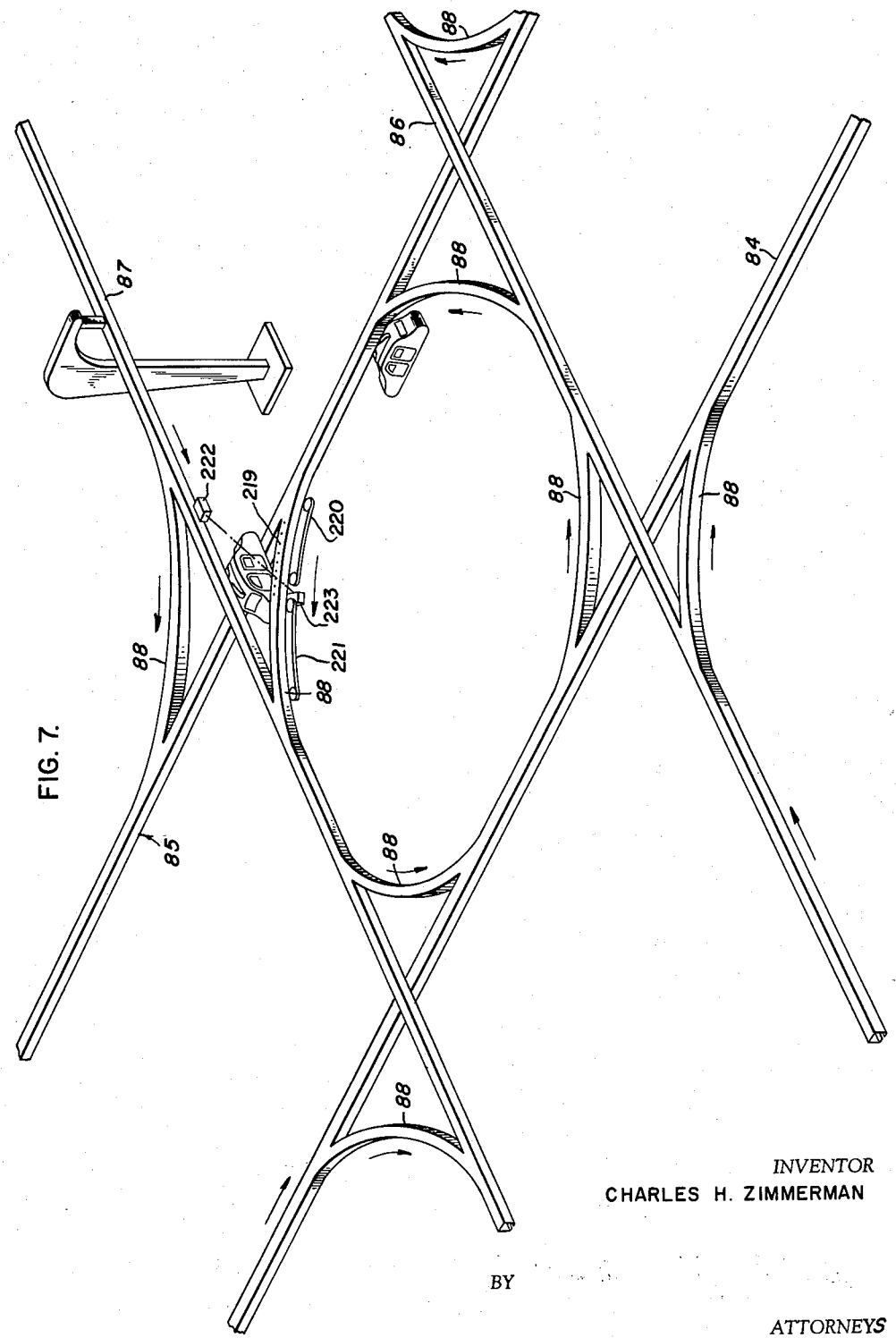
FIG. 7 shows a preferred interchange arrangement.

While the clover-leaf interchange shown in FIG. 5 may be employed without difficulty, a preferred interchange is disclosed in FIG. 7, where east-west monorails are indicated at 84 and 85, respectively, while the north and south main monorail tracks are indicated at 86 and 87, respectively. This interchange includes short, curved auxiliary track sections 88, either ascending or descending, as the case may be. Each track section 88 includes a braking section 219, a conveyor 220 for moving a vehicle along the auxiliary track 88, and an accelerating conveyer 221. A vehicle transferring from the one main line to another main line would follow the short curving sections in the directions indicated by arrows. These short sections include switching devices similar to the devices shown in FIG. 11 for the curved track section 79, such as, track switch device 77 and switch device 80. In addition, interlock devices 222 and 223 may prevent operation of the accelerating conveyer 221 if a vehicle on track 87 is approaching or in the intersection.

A third method of effecting a transfer at an interchange of a vehicle from one monorail system to another monorail system is disclosed in FIGS. 8 and 9. The intersection is shown in connection with a north monorail track 89 and an east monorail track 91, with the transfer being for a vehicle from the north main monorail 89 to the east main monorail 91. A vehicle traveling north on monorail track 89 is shifted to monorail track 92 at switch point 90, at which point its driving unit is de-energized. The vehicle is decelerated by a braking system shown in FIGS. 29 and 30 and described more fully hereinafter. At the same time the vehicle is shifted to track 92, conveyer 93 is energized. Conveyer 93 has a speed substantially less than the speed of a vehicle traveling on the main monorail tracks such that when the braking system has slowed the vehicle to a speed slightly below the speed of conveyer 93, the conveyer 93 will move the vehicle at a very slow speed into a short section of movable track 94. The short movable track section 94 is carried by a vertical support member 95. The track section 94, of course, is provided with stops (not shown) at each end so that once the vehicle is positioned intermediate the ends of the track section the vehicle will not move off of the track section. When the vehicle is positioned intermediate the ends of the track section 94 vertical supporting member 95 is lowered and rotated through approximately 90 degrees. Track section 94 is lowered to the extent necessary to align it up with track section 96. When track section 94 has been aligned with track section 96, conveyer 99 is energized to move the car off of the short track section onto track 96. Conveyer 97, extending along track 96, is an accelerating conveyer and accelerates the vehicle up to the system speed so that prior to entry onto the main monorail 91, the vehicle is traveling at substantially the uniform speed of the system. However, an interlock control 101 along track 91 prevents energization of conveyer 97 through interlock device 102 so that a vehicle nearing the intersection or in the intersection may proceed safely without interference from a vehicle on track section 96.

The intersections described above are for use chiefly where two main systems cross each other. The interchange shown in FIGS. 10 and 12 is for a T-type intersection where a pair of north and south monorail tracks 104 and 105, respectively, terminate. (While it may appear that the connecting tracks 108 and 107 in FIG. 10 are irregular, this is due to the fact that this is an isometric view looking somewhat downwardly at the intersection. Actually, tracks 108 and 107 form smooth curves as seen in FIG. 12.) As in the earlier described interchanges, switching devices similar to those described hereinabove are employed as well as the deceleration and conveyer systems and interlocking devices to delay a transfer by one vehicle on one monorail system to another system in case a second vehicle is approaching the interchange or is in the interchange such that the transfer cannot safely be made without interfering with the spacing of the vehicles on the main monorail lines. Arrows indicate the direction of travel of vehicles negotiating the interchange.

Any of the above-described interchanges may be used and are merely examples of various arrangements designed to accommodate the locale and traffic on the systems. It is essential that any interchange include a vehicle deceleration system, means for moving the vehicles through the auxiliary track systems constituting the interchange, an acceleration system and an interlock system to prevent inadequate spacing of vehicles on main monorail systems.

FIGS. 13 and 14 show a car at a station stop and held in position by bumpers 115 and 116 located on each side of the station. Springs 117 resiliently urge the bumpers to engage the sides of the car. It will be noticed that the surface of the station platform 52 is essentially level with the entrance step to the vehicle. An open door detecting device 118 assures that the doors 119 of the vehicle are closed before the vehicle leaves the station.

The cars are suspended from motorized carriages which are substantially completely enclosed within the main monorail track. A complete self-propelled vehicle includes a motorized carriage, a load carrying car and a suspension for the car from a self-propelled carriage. A main monorail track section 121 (FIGS. 24 and 26) generally rectangular in cross section and slotted on its bottom side as at 122, supports a motorized carriage 123 on the inside lower horizontal surface 124. These surfaces 124 are lined with a tough, slightly resilient material to reduce noise and vibration. The monorail track 121 supports in one of the sidewalls thereof an insulating member 126, which supports electrical conductors 127, 128 and 129. These electrical conductors supply power to an electric motor in the carriage through brushes 131, 132, and 133, respectively.

In a preferred form of the motorized carriages, the power unit includes a synchronous motor which develops a uniform speed as set by the frequency of the driving voltage impressed on the synchronous motor by the power supplied through conductors 127, 128 and 129. Since all carriages are driven from the same power source and have the same synchronous speed, all of the vehicles on the system travel at a common and fixed uniform speed once they are on the main monorail track section. Otherwise, at the station stops, the carriages are disengaged from the power supply system and are moved through the station stops by means outside the normal driving system.

Each carriage is provided with a pair of front wheels 134 and a pair of rear wheels 135, some or all of which may be driven by the synchronous electric motor. It is preferred, however, that all wheels be driven so that the wear on all wheels is uniform.

Each motorized carriage includes a projection 136 rigid with the carriage and projecting forwardly thereof and having mounted thereon a set of lateral guide wheels 137 having vertical axes of rotation and engaging the sidewalls of the monorail track. The set of lateral guide wheels 137 may be driven through a suitable gearing system from the synchronous motor, or may revolve freely on their axis. However, these lateral guide wheels revolve at synchronous speed and bear against the vertical sidewalls of the monorail track when the carriage is displaced slightly from the center of the track. These lateral guide wheels also facilitate the switching of the vehicle in a manner to be described later in connection with the switches themselves.

Mounted on the forwardly extending projection 136 is a generally triangularly shaped lance 138 which, in the embodiment shown in FIGS. 25, 26 and 27, is movable to the right or to the left of a central position along the longitudinal axis of the carriage. While any number of methods may be employed to shift lance 138 to the right or to the left, only one method is shown in the drawings. Lance 138 is pivoted at 139 on a forwardly extending projection 136 and has an extension 141 (FIG. 27) extending rearwardly of pivot 139. A pin 142 on the rear end of lance extension 141 projects through an arcuate slot 143 formed in the forwardly extending projection 136. A T-shaped control member 144 pivotally mounted on the frame of the carriage at 145 is provided with a lost motion slot 140 which receives pin 143 on the same lance extension 141. Each arm of the control member 144 is connected to solenoids 146 and 147 which respectively control the left and right directions to which the lance 138 is moved. These solenoids are electrically connected to the left and right control buttons on the control panel shown in FIG. 34.

In FIGS. 17 and 18 is shown a switching device operated by the lance shown in FIGS. 25, 26 and 27. This switching device includes a movable guide element 148 having a guide surface 149 for through operation and a guide surface 151 for switching. Guidance element 148 is pivoted at 152 and normally urged to the position shown in solid lines by compression spring 153. In the position shown in solid lines in FIG. 17, guidance element 148 forms a smooth surface for the lateral guidance wheels 137 on the motorized carriage so that this switching device has no effect on switching the vehicle if the lance is in its central position. However, assume that switching to the left is desired. On depressing the left button of the control panel, the tip of lance 138 is shifted to the left of the central position by solenoid 146 to engage a trough 154 (FIG. 18) in the sidewall of the monorail track and cams the guidance element 148 to the position shown in dotted lines. A groove 155 receives the tip of the guidance element in the position shown in dotted lines in FIG. 17 so that a smooth surface is presented to the lateral guidance wheels.

The lance 156 shown in FIGS. 23 and 23a is fixed with respect to the motorized carriage which is substantially identical to the carriage shown and described in connection with FIGS. 25, 26 and 27. In this instance, however, the lance is fixed and the track switch is actuated by a solenoid. A fixed lance 156 cooperates with the switching device shown in FIG. 19. The track switch shown in FIG. 19 is substantially similar to the switching device shown in FIG. 17 except there is included a solenoid 157 for actuating the movable element 148 (similar reference numerals are employed in FIG. 19 as in FIG. 17 except with a prime mark). In this arrangement the movable element actuating solenoid 157 is controlled by signals transmitted from the car, either by electrical conductors (not shown) carried by the monorail track section or by other suitable coupling devices (not shown) such as radio, lightwaves, etc. In this embodiment, the lance 156 assures that a partially open monorail track switch is forced into a fully opened or fully closed position by the time the main portion of the motorized carriage has arrived, and prevents the possibility of an accident wrecking a car and fouling the main monorail track system.

For entrance from a station stop or from an auxiliary track at an interchange, the switch guidance element disclosed in FIG. 22 is provided with a through guiding surface 159 which is normally held in the position shown in FIG. 22 by compression spring 161. A second guiding surface 160 on the opposite side of guidance element 153 is moved to form a smooth track section by engagement with a lance on a vehicle emerging from the side track. After the entering vehicle has passed the switch, spring 161 switches guiding element 158 back to its normal position so that guiding surface 159 presents a smooth surface to through traffic on the main monorail system.

A projection 162 rigid with and depending from carriage 123 through slot 122 is bored on an axis parallel to the longitudinal axis of the motorized carriage to provide a pivot having an axis parallel to the longitudinal axis of the motorized carriage. A clevis 164 pivotally supported on pivot 163 has formed on its lower end a pivot 165. A projection 166 on the top of a car is pivotally secured to clevis 164 and pivots about pivot 165. Thus, the car is suspended through a point permitting it to swing laterally about the longitudinal axis of the motorized carriage as well as about a transverse axis so that the car may swing fore and aft near the track. This avoids the necessity for wide spacing of the supporting wheels and allows a smaller construction of the monorail track. In addition, this will allow a vehicle to negotiate a curve without having to bank the track. Of course, the car is designed as shown in FIG. 24 aerodynamically to minimize the effect of cross winds movement. The fore and aft axis of the vehicle as well as lateral movement about the longitudinal axis of the motorized carriage may be damped, either by hydraulic of frictional means (not shown) to prevent undesirable swinging.

Taken collectively, FIGS. 28, 28a and 28b illustrate a complete station stop in which the cars are moved from point to point at the station by a series of endless belt or chain systems. Located at the point indicated generally by the letter S is a track switch device (not shown but similar to the one shown in FIGS. 17 and 18 or the one shown in FIG. 19). Located at the point designated generally by the letter T is an entrance switch similar to the one shown in FIG. 22 for allowing entry of a car from the station onto the main line. A series of cars, 168–174 inclusive are shown at different stages of passing-through the station. Car 168 shown at a position at approximately the end of a deceleration section. A simplified braking arrangement for use in the deceleration section of the station is shown in FIGS. 29 and 30 where a heavy strip or slab of braking material 177 is resiliently urged from the upper cover of the monorail track section by springs 178 and guided by guide posts 179 projecting through holes in the cover of the track section. This braking material 177 is pressed against the upper surface of the carriage with a uniform pressure produced by the loading of springs 178.

Obviously, heavily loaded cars will not stop in the same distance as lightly loaded cars, the distance being proportional to the load in the car. This is not important since the conveyer systems alongside the final portion of the braking system positively move the car forward to the unloading point, or to a waiting section in more heavily used stations. One such conveyer arrangement is shown in FIGS. 32 and 33. The projecting arms on the conveyers are shown in FIGS. 15 and 16. A motor 181 drives an endless belt or chain 182 which belt or chain carries a series of projecting arms 183. Projecting arms 183 are spacedly hinged at points along the endless belt 182 and are urged in such a way by springs 184 that they are forced out of the way of a car moving forward relative to a non-moving belt, or a car moving faster than a moving belt. If the belt begins to move faster relative to the car, one of the projecting arms 183 immediately catches behind a bearing point provided on projection 162 just below the tracks and impels the car forward at the speed of the belt.

As shown in FIGS. 28, 28a and 28b the cars can be passed forward from one belt system to another by placing the belts alternately on opposite sides of the tracks. In addition interlock control units 185, 185a 185b . . . 185g control the operation of the conveyer motors 181, 181a, 181b . . . 181g so that the conveyer will not move a car beyond a specified point until a space has been provided for it by the next succeeding conveyer system. Thus, car 169 will not be moved to the position of car 170 until car 170 has been moved forwardly at least one position to allow room for car 169. Normally, car 168 will not be moved to position of car 169 until car 169 has been moved to the position of car 170. It follows also that cars 171 and 172 will not be moved until the car ahead of them has been moved forward. A car 170 is at an unloading point while car 172 is shown at a loading station. Car 171 is an empty car and awaits the loading and removal of car 172 from the loading station. It is obvious however, that several loading and unloading points may be provided in a station and only single loading and unloading points have been described for purposes of illustration only.

As each car is loaded and prepared for entrance onto the main monorail system, an auxiliary accelerating conveyer section, utilizing accelerating conveyers shown at 186 and 187, accelerates a vehicle up to substantially the system speed.

The drive motors for the accelerating conveyers have sufficient capacity to accelerate a vehicle at a constant acceleration to a speed sufficiently above the uniform speed of the system so that the car will be able to coast through the entrance switch to the main monorail track with a speed slightly above the system speed.

Interlocks 190 and 190a cooperate with the control units 185h and 185i of accelerating conveyers 186 and 187 prevent operation of these accelerating conveyers until it is safe to accelerate a vehicle to the system speed for entry onto the main monorail system. Thus, car 174 is shown in the process of being accelerated by a conveyer 187 to the system speed since it will be able to effect entry onto the main monorail system at a sufficient distance ahead of car 176 so that there will be no chance of interference between these two cars and the spacing between the vehicles due to the uniform speed of the system will be maintained. However, the vehicle 173 will remain at its position until vehicle 176 on the main monorail system has travelled past interlock device 188 a sufficient distance to allow the acceleration and entry of car 173 onto the line a sufficient distance behind vehicle 176 so that the spacing on the system will be maintained.

In the event a car 180 carrying several passengers stops at a station to discharge one or more passengers, and the remaining passengers are to be transported to another down line station, a station vehicle by-pass arrangement is provided as shown in FIGS. 31 and 31a. This arrangement includes a movable track section 189 supported for transverse movement on rails 191, and conveyer systems 192 and 193. An auxiliary station stop by-pass monorail 194 having accelerating conveyers 195, 196, 197 and 198, intersects the station monorail at point 199, which point is provided with a switching device similar to the device shown in FIG. 22. After unloading a passenger or passengers, the monorail track section 189 is moved transversely along rails 191 to the dotted position shown in FIG. 31. At this position, conveyer system 193 is energized to move the vehicle 180 onto the accelerating track section where, the vehicle 180 will be accelerated to the uniform speed of the system by conveyers 195, 196, 197 and 198. As noted earlier, if a vehicle is on the main monorail system such that entry of vehicle 180 would interfere with the minimum spacing of the system, energization of conveyers 195, 196, 197 and 198 will be delayed through the interlock devices described in connection with FIGS. 28, 28a and 28b. Of course, if vehicles 200 and 201 were not present, vehicle 180 would proceed through the station on track 202.

An important part of the system includes an electrical circuit for automatic interrogation of up line stations by a down line station to determine the presence of the nearest idle car available for use at the down line station, and automatically effecting movement of the idle vehicle to the desired station. A schematic diagram for such a system is shown in FIG. 35, where the circuit for two station stops, X and Y, are shown, station X representing a down line station where no vehicle is present and station Y representing an up line station where there is an idle vehicle.

The stations are interconnected by electrical conductors 203 and 204. At each station stop there is a fare operated switch 205x having a switch element 206x, shown at station X in an unoperated or normal condition by dotted lines, and in coin operated condition by solid lines. A power source for station X, as shown as a battery 207x, is connected across conductors 203 and 204 through switch element 206x of fare operated switch 205x. The circuit through a pair of vehicle detecting contacts 208 and 209 is normally completed through a circuit on a car, as shown in solid lines at station Y and broken lines at station X. This circuit includes one coil 211x of a two coil relay 212x. The second coil 213x of relay 212x is connected in parallel with coil 211x and operates in opposition to coil 211x so that one or the other of the coils is effective to control switch element 214x. Switch element 214x completes the circuit through contact 215x to connect conductors 204 and 203 in series with battery 207x. Relay coils 211x and 213x are chosen so that current through coil 211x will predominate to hold switch element 214x into position shown in dotted lines in station X.

In operation, a coin deposited in slot 55 (FIG. 4) at station X will move switch element 206x to energize conductors 203 and 204 from battery 207x. If a car is present, a circuit is completed through contacts 208x and 209x by a circuit on the car to relay coil 211x, which will hold switch element 214x in the position shown in dotted lines. However, if a car is not available at station X relay coil 213x is effective to move switch element 214x to the position shown in solid lines to apply the interrogating signal power from battery 207 to conductors 203 and 204 outside station X. As noted, the circuitry at station Y is similar to the circuitry at station X. Thus, if a car is available at station Y, a circuit is completed to relay coil 211Y and holds switch element 214Y in the position shown in solid lines (e.g., open). With switch element 214Y in the position shown, the circuit conductor 203 is open so that the other down line station interrogation circuits are unaffected. Energizing the circuit through the car at station Y also initiates operation of the conveyer of said station Y to move the idle car from the loading and accelerating sections to the main monorail line where it proceeds along the main monorail line towards station X. When the circuit to the idle car was initially energized, a switch in the car (not shown) is set to be tripped by a device (not shown) along the main monorail line preceding the switch to station X. As the idle car passes the device near station X, this switch is triggered to operate the "stop" button circuit, which in turn produces the normal stop sequence for the idle vehicle at station X.

While automatic control of the vehicle is preferred, the system is amenable to semi-automatic control. For instance, a central dispatch office may be provided with a schematic layout of the system. Lights or other indicators on the schematic layout indicate the locations of idle cars. A fare deposited at a stop where there is no car in its loading, unloading, holding or braking positions will cause another indicator at the central office to indicate, at the corresponding point on the schematic layout, the need for a car at that point. A dispatcher, by pressing a button corresponding to the station with an idle car nearest to the station calling for a car, will energize an electric circuit in the idle car to cause it to be accelerated from its station onto the main monorail line. This car will then proceed to the calling station automatically as described hereinabove.

While illustrative embodiments of the invention have been described in detail hereinabove, it will be readily understood that many variations are possible, some of which have been mentioned above, without departing from the spirit of the invention as disclosed in the following claims.

I claim:

1. An overhead monorail system comprising a main monorail track adapted to support a self-propelled vehicle for movement along said main monorail track at a fixed system speed, a station adjacent said main monorail track comprising a second monorail track having ends intersecting said main monorail track at spaced points therealong, a station entrance switch at one of said points selectively operable to switch said vehicle from said main monorail track to said second monorail track, a station exit switch at the other of said spaced points operable to allow a vehicle to enter said main monorail track from said second monorail track, brake means operating between said second monorail track and said vehicle for decelerating said vehicle, and means adjacent said second monorail track for moving a decelerated vehicle through an unloading point, a loading point to an acceleration section for re-entry onto said main monorail system through said station exit switch.

2. An overhead monorail system as defined in claim 1 wherein said means adjacent said second monorail track includes a series of end-to-end conveyer systems, each of said conveyers having means for engaging the vehicle and moving said vehicle through said station at a speed substantially below the fixed system speed of a vehicle on the main monorail track.

3. An overhead monorail system as defined in claim 1 wherein said acceleration section includes a conveyer system having means adapted to engage said vehicle and accelerate said vehicle to a speed substantially equal to the fixed system speed of a vehicle on the main monorail track.

4. An overhead monorail system comprising a main monorail track adapted to support a plurality of self-propelled vehicles for movement along said main monorail track at a common system speed, a station adjacent said monorail track comprising a second monorail track having ends intersecting said main monorail track at spaced points therealong, a station entrance switch at one of said points selectively operable to switch a vehicle from said main monorail track to said second monorail track, a station exit switch at the other of said spaced points, brake means operating between said second monorail track and a switched vehicle for decelerating said diverted vehicle, conveyor means adjacent said second monorail track for moving a decelerated vehicle through an unloading point, a loading point to an accelerating section, an accelerating conveyor system adjacent said acceleration section for accelerating a vehicle to said common system speed for re-entry onto said main monorail track through said station exit switch, an interlock control device on said main monorail track, means coupling said interlock control device to said accelerating conveyor system such that the passage of a vehicle on said main monorail track actuates said interlock control device to prevent the operation of said accelerating conveyor until the vehicle on the main monorail track has passed the station.

5. A vehicular monorail system comprising a main monorail track, a plurality of vehicles mounted for movement along said track in one direction at a uniform system speed, power means on each of said vehicles for moving said vehicles along said main monorail track at said uniform speed, a plurality of stations along said main monorail track, each of said stations including a second monorail track with ends intersecting said main monorail track at spaced points therealong, switch means at one of said ends for selectively diverting vehicles onto said second monorail track and de-energizing said power means, sensing means at each of said stations for determining the presence of a vehicle at the station, connecting means for connecting the sensing means at a down line station to the sensing means at up line stations whereby the absence of a vehicle at a down line station causes an interrogation signal to be transmitted to the nearest up line station where a sensing means is sensing the presence of a vehicle, which signal is effective to cause a vehicle to move from said nearest up line station to the down line station.

6. The monorail system defined in claim 5 wherein said connecting means sequentially applies said interrogation signal to the up line stations until the nearest up line station having a vehicle is found, and further including means for terminating the transmission of said interrogation signal at said nearest station.

7. In a vehicular monorail system having a main monorail track interconnecting a plurality of stations along the main monorail track and a plurality of self-propelled vehicles adapted to travel on the main monorail track, a signaling system interconnecting the stations for automatically effecting movement of an idle vehicle from one station to a calling station comprising conductor means interconnecting up line stations with down line stations, a signaling power supply at each of the stations, a first switch means at each of the stations for connecting said signaling power supply to the conductor means to up line stations, second switch means at each of said stations for disconnecting said signaling power supply from the conductor means to up line stations if a vehicle is present at the station.

8. In a vehicular monorail system having a main monorail track interconnecting a plurality of stations along the main monorail track and a plurality of self-propelled vehicles adapted to travel on the main monorail track, a signaling system interconnecting the stations for automatically effecting movement of the nearest idle vehicle from an up line station to a down line station comprising conductors normally interconnecting the stations, a signaling power supply at each of the stations, switch means at each of the stations for connecting said signaling power supply to interconnecting conductors to up line stations and disconnecting the station from conductors to down line stations, a relay at each of the stations, a switch element operated by said relay, and normally in circuit with up line station interconnecting conductors, a first circuit connecting said relay to said signaling power supply through a vehicle at the station to disconnect said signaling power supply from the interconnecting conductors to up line stations, and a second circuit connecting said relay to said signaling power supply effective when a vehicle is not present at the station to operate said switch element and connect said signaling power supply to the interconnecting conductors to up line stations.

9. The system defined in claim 8 wherein said switch means at each station is adapted to be operated by a coin.

10. A transportation system comprising a main monorail system, a plurality of self-propelled vehicles movable on said main monorail system at a uniform speed, an auxiliary monorail system, switch means for selectively switching vehicles from said main monorail system to said auxiliary monorail system, means along said auxiliary monorail system for decelerating a vehicle switched to said auxiliary monorail system by said switch means, means for moving a vehicle on said auxiliary monorail system at a speed below the uniform speed of the main monorail system, and means for accelerating a vehicle on said auxiliary monorail system to the uniform speed of the main monorail system for re-entry thereon.

11. The transportation system of claim 10 including an interlock control device on said main monorail system, means coupling said interlock control device to said vehicle accelerating means so as to prevent operation of said vehicle accelerating means when another vehicle is near the point of re-entry of a vehicle on said auxiliary monorail system to said main monorail system.

12. In a monorail transportation system an interchange for transferring a vehicle from one main monorail track to another main monorail track, said interchange comprising an auxiliary monorail track system, switch means for selectively switching a vehicle from one of said main monorail tracks to said auxiliary track system, means along said auxiliary track system for decelerating a vehicle, means for moving a vehicle on said auxiliary track system at a speed which is below the normal speed of the vehicle when traveling on the main monorail tracks, and means for accelerating a vehicle on said auxiliary monorail system to its normal speed for entry onto the other of said main monorail tracks.

13. The monorail transportation system of claim 12 including an interlock control device on said other main monorail track, means coupling said interlock control device to said vehicle accelerating means to prevent operation of said vehicle accelerating means when another vehicle on said other main monorail track is near the point of entry of a vehicle on said auxiliary monorail system to said other main monorail system.

14. A transportation system comprising a main monorail track, carriages mounted for independent movement on said main monorail track, power means for each of said carriages for moving said carriages at a common speed, said power means including an electric motor, electrical conductors carried in said main monorail track and means connecting said electric motor to said conductors, load carrying cars suspended from said carriages and independently moved at said common speed, a station adjacent said track comprising a second monorail track, monorail switch means for selectively switching the carriages from said main monorail track to said second monorail track and de-energizing said power means, and brake means operating between said second monorail and said carriages for decelerating said carriages.

15. A transportation system as defined in claim 14 wherein said electric motors are synchronously operated.

16. A transportation system as defined in claim 15 including means adjacent said second monorail track for moving said carriages through the station at a speed substantially below the common speed of the system.

17. A transportation system as defined in claim 16 wherein said last named means comprises a conveyer having a linear speed substantially less than said common system speed, said conveyer being effective when said carriage has been decelerated by said braking means to a speed below the speed of said conveyer for moving said carriage to a discharge point.

18. A transportation system comprising a main monorail track, carriages mounted for movement on said main monorail track, each of said carriages having power means for moving said carriage at a uniform system speed along said main monorail track, a car suspended from each of said carriages and movable therewith at said uniform speed, a station adjacent said track comprising a second monorail track, monorail switch means selectively operated for diverting said carriages from said main monorail track to said second monorail track and de-energizing said power means, brake means operating between said second monorail track and said carriages for decelerating said carriages, a discharge pilot along said station, a loading point along said station, means for moving said carriages from said discharge point to said loading point, and means for accelerating said carriages from said loading point to said main monorail track to said constant speed.

19. A transportation system as defined in claim 18 including automatic interlocking means operating between said accelerating conveyer and said main track preventing operation of said accelerating conveyer if a car is on a selected portion of said main track near the station stop track section.

20. In combination, a main monorail track, a side monorail track intersecting said main monorail track, means for allowing a vehicle on the side monorail track to pass through said intersection to said main monorail track, comprising a switch member movably supported on one of the tracks, a through guidance surface on said member adapted to form with the main monorail track an uninterrupted surface with the main monorail track to allow a vehicle traveling on the main monorail track to pass through the intersection, means biasing said movable member so that said through guidance surface forms a through track with said main monorail track, and another guidance surface formed on the movable member adapted to form an uninterrupted surface with a portion of said side monorail track and said main monorail track for guiding a vehicle from the side monorail track to the main monorail track through said intersection.

21. The combination as defined in claim 20 wherein said switch member is pivotally supported on one of said track sections.

22. The combination as defined in claim 20 wherein said switch member is cammed into position by a vehicle approaching the intersection on the side monorail track.

References Cited in the file of this patent

UNITED STATES PATENTS

| 761,484 | Hetzel | May 31, 1904 |
|---|---|---|
| 791,091 | Gamalielson | May 30, 1905 |
| 1,305,415 | Steffens | June 3, 1919 |
| 1,327,071 | Taylor | Jan. 6, 1920 |
| 1,404,177 | Lake | Jan. 17, 1922 |
| 1,860,241 | Galko | May 24, 1932 |
| 1,864,367 | Nicholson et al. | June 21, 1932 |
| 1,917,837 | Haddlesay | July 11, 1933 |
| 2,014,929 | Frank | Sept. 17, 1935 |
| 2,040,353 | Wilson | May 12, 1936 |
| 2,254,142 | Glasgow | Aug. 26, 1941 |
| 2,322,640 | Jackson et al. | June 22, 1943 |
| 2,612,847 | Burrows | Oct. 7, 1952 |
| 2,688,931 | Spafford | Sept. 14, 1954 |
| 2,688,932 | Heil | Sept. 14, 1954 |
| 2,714,355 | Benson | Apr. 2, 1955 |
| 2,782,727 | King | Feb. 26, 1957 |
| 2,825,291 | Chadenson | Mar. 4, 1958 |
| 2,832,297 | Daniels | Apr. 29, 1958 |
| 2,863,398 | Granath | Dec. 9, 1958 |
| 2,868,138 | Bishop et al. | Jan. 13, 1959 |
| 2,925,787 | Rubenstein et al. | Feb. 23, 1960 |

FOREIGN PATENTS

| 422,696 | France | Jan. 26, 1911 |